(12) United States Patent
Morton et al.

(10) Patent No.: US 11,260,475 B2
(45) Date of Patent: Mar. 1, 2022

(54) METHOD AND SYSTEM FOR POWDER BED FUSION ADDITIVE MANUFACTURING OF CRACK-FREE ALUMINUM ALLOYS

(71) Applicant: Board of Regents, The University of Texas System, Austin, TX (US)

(72) Inventors: Philip Alexander Morton, El Paso, TX (US); Syed Zia Uddin, El Paso, TX (US); Ryan B. Wicker, El Paso, TX (US); David Espalin, El Paso, TX (US); Lawrence Eugene Murr, El Paso, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 395 days.

(21) Appl. No.: 16/057,742

(22) Filed: Aug. 7, 2018

(65) Prior Publication Data
US 2019/0039183 A1     Feb. 7, 2019

Related U.S. Application Data

(60) Provisional application No. 62/542,097, filed on Aug. 7, 2017.

(51) Int. Cl.
| | |
|---|---|
| *B23K 26/342* | (2014.01) |
| *B23K 26/03* | (2006.01) |
| *B23K 26/70* | (2014.01) |
| *H05B 6/10* | (2006.01) |
| *B23K 26/082* | (2014.01) |

(Continued)

(52) U.S. Cl.
CPC .......... *B23K 26/342* (2015.10); *B22F 3/105* (2013.01); *B22F 10/20* (2021.01); *B23K 26/034* (2013.01); *B23K 26/082* (2015.10); *B23K 26/702* (2015.10); *C22C 1/0416* (2013.01); *C22C 21/00* (2013.01); *C22C 21/08* (2013.01); *C22C 21/10* (2013.01); *C22C 21/14* (2013.01); *C22C 21/16* (2013.01); *H05B 6/101* (2013.01); *B22F 2202/17* (2013.01); *B22F 2203/11* (2013.01); *B22F 2998/10* (2013.01); *B22F 2999/00* (2013.01); *B23K 2101/006* (2018.08); *B23K 2103/10* (2018.08); *B33Y 10/00* (2014.12); *B33Y 70/00* (2014.12)

(58) Field of Classification Search
CPC ....... B23K 26/342; B22F 3/1055; B22F 3/105
See application file for complete search history.

(56) References Cited

U.S. PATENT DOCUMENTS

| | | | |
|---|---|---|---|
| 2015/0054191 A1* | 2/2015 | Ljungblad | B22F 3/1055 264/112 |
| 2015/0290710 A1* | 10/2015 | Ackelid | B29C 64/153 419/30 |

(Continued)

OTHER PUBLICATIONS

Olakanmi et al., A review on selective laser sintering/melting (SLS/SLM) of aluminium alloy powders: Processing, microstructure, and properties, Oct. 2015, Progress in Materials Science, vol. 74, pp. 401-477 (Year: 2015).*

*Primary Examiner* — John J Norton
(74) *Attorney, Agent, or Firm* — Yee & Associates, P.C.

(57) ABSTRACT

A method of forming a crack-free aluminum alloy structure using additive manufacturing is presented. A powder bed of precursor aluminum alloy powder is heated. The crack-free aluminum alloy structure is formed within a laser powder bed fusion system encompassing the powder bed during heating.

23 Claims, 19 Drawing Sheets

(51) Int. Cl.
  *C22C 1/04* (2006.01)
  *C22C 21/10* (2006.01)
  *C22C 21/00* (2006.01)
  *C22C 21/08* (2006.01)
  *C22C 21/16* (2006.01)
  *C22C 21/14* (2006.01)
  *B22F 3/105* (2006.01)
  *B22F 10/20* (2021.01)
  *B33Y 10/00* (2015.01)
  *B33Y 70/00* (2020.01)
  *B23K 103/10* (2006.01)
  *B23K 101/00* (2006.01)

(56) References Cited

U.S. PATENT DOCUMENTS

| | | | | |
|---|---|---|---|---|
| 2015/0367415 | A1* | 12/2015 | Buller | B22F 3/004 |
| | | | | 419/53 |
| 2016/0288266 | A1* | 10/2016 | Rockstroh | B23K 26/702 |
| 2017/0014937 | A1* | 1/2017 | Wilhelmy | B23K 35/3601 |
| 2017/0182595 | A1* | 6/2017 | Nelson | B23K 15/0086 |
| 2017/0291372 | A1* | 10/2017 | Milshtein | B33Y 30/00 |
| 2017/0312857 | A1* | 11/2017 | Bourell | C22C 21/08 |
| 2018/0273631 | A1* | 9/2018 | Glennie | A61P 29/00 |
| 2018/0339339 | A1* | 11/2018 | Karlen | B22F 1/0003 |
| 2019/0032175 | A1* | 1/2019 | Martin | C22C 1/10 |

* cited by examiner

SCHEMATIC OF GRADED MATERIAL CONTAINING
TWO DIFFERENT MICROSTRUCTURES (A,B)
RESULTING FROM TWO PARAMETERS SETS (A,B)

METHOD AND SYSTEM FOR POWDER BED FUSION ADDITIVE MANUFACTURING OF CRACK-FREE ALUMINUM ALLOYS

CROSS-REFERENCE TO RELATED APPLICATIONS

This application claims priority to provisional U.S. Patent Application No. 62/542,097 filed on Aug. 7, 2017, the entire disclosure of which is incorporated by reference herein.

TECHNICAL FIELD

Embodiments are generally related to 3-D printing technology. Embodiments are additionally related to methods and systems for metal powder bed fusion additive manufacturing of crack-free aluminum alloys.

BACKGROUND

Metal powder bed fusion additive manufacturing (AM) technologies have allowed for the fabrication of complex geometries without the need of tooling, molds, or dies while also limiting material waste. Electron beam melting (EBM), for example, uses a metal powder precursor material that is selectively melted in a layer-by-layer fashion using an electron beam, referred to as powder bed fusion. Powder bed laser melting (LM) technology is another type of additive manufacturing AM technologies like LM have seen increased use in aerospace, biomedical, and automotive industries to manufacture re-engineered components with improved performance as a result of added complexity and functionality. For example, the combined use of aluminum, titanium, and carbon fiber materials enable the aerospace industry to produce efficient (in terms of weight and cost) commercial and military aircraft. For instance, the Boeing 787 is composed of 50% (by weight) composites, 20% aluminum, 15% titanium, 10% steel, and the remainder is other materials.

Although the use of aluminum has decreased when compared to its predecessor Boeing 777 (down from 50%), aluminum still plays a critical role in most leading edges of the aircraft body as well as the tail and horizontal stabilizers. Processing of aluminum alloys with additive manufacturing (AM) technologies, using either powder bed fusion or directed energy deposition processes, are therefore important for the fabrication of legacy and new aircraft parts.

The aluminum alloy 6601 (AA6061) is a heat treatable material primarily composed of aluminum, silicon and magnesium with a small amount of iron, copper, chromium, zinc, manganese and titanium. Common applications of the material include construction of aircraft and automobile components. Traditionally, AA6061 is cast and then shaped using rolling, forging or extrusion. The alloy offers good machineability and weldability with proper filler material although with a reduction in maximum tensile strength down to that of annealed condition, which is 120 MPa from tempered strength of 210 MPa.

However, traditional shaping techniques such as rolling, forging and extrusion have not fully realized complex geometries while taking advantage of the desirable combination of high strength-to-weight ratio, corrosion resistance, and thermal conductivity (as high as 167 W/m-K) that aluminum 6061 offers. That is, traditional shaping techniques have not been able to create complex internal cavities, conformal cooling, and thin features.

Moreover, casting with AA6061 is difficult due to hot tearing and hot cracking. AA6061 is susceptible to hot tearing due to a large $\Delta T=(T_{liquidous}-T_{solidous})$ value of 70 K. Another source of crack formation is hot cracking. Hot cracking has an established correlation with alloy composition. AA6061 fell within the Al—Mg—Si—Fe—Ti system. The system was reported to have a maximum hot cracking susceptibility at 0.3-0.4% Fe, 0.5% Mg, 0.5% Si, and 0.15% Ti which is close to AA6061.

Accordingly, the methods and systems disclosed herein are intended to solve such problems (for example for LM AA6061) such that fabricated parts do not exhibit cracking and maintain relatively high density.

SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the disclosed embodiments to provide enhanced additive manufacturing techniques. It is another aspect of the disclosed embodiments to provide methods and systems for powder bed additive manufacturing including laser melting, electron beam or electromagnetic based PBF technologies. It is another aspect of the disclosed embodiments to provide a method and system for solidification rate control and in situ heat treatment in metal powder bed fusion additive manufacturing.

The illustrative embodiments provide a method of forming a crack-free aluminum alloy structure using additive manufacturing. A powder bed of precursor aluminum alloy powder is heated. The aluminum alloy powder comprises AA6061, AA2014, AA2017, AA2024, AA2219, AA5083, AA7050, AA7075, AA7150, AA7178, or AA7475. The crack-free aluminum alloy structure is formed within a laser powder bed fusion system encompassing the powder bed during heating.

The illustrative embodiments provide a method of forming a crack-free aluminum alloy structure using additive manufacturing. A precursor aluminum alloy powder is introduced to a laser powder bed fusion system without nucleation aids or other alloy modifying aids. The aluminum alloy powder comprises AA6061, AA2014, AA2017, AA2024, AA2219, AA5083, AA7050, AA7075, AA7150, AA7178, or AA7475. A powder bed of the precursor aluminum alloy powder is heated within the laser powder bed fusion system to a range of 350° C. to 500° C. using an induction heater. The crack-free aluminum alloy structure is formed from the aluminum alloy powder within the laser powder bed fusion system during heating.

The aforementioned aspects and other objectives and advantages can now be achieved as described herein.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present disclosure when read in conjunction with the accompanying drawings, wherein:

DETAILED DESCRIPTION

Figure 1:
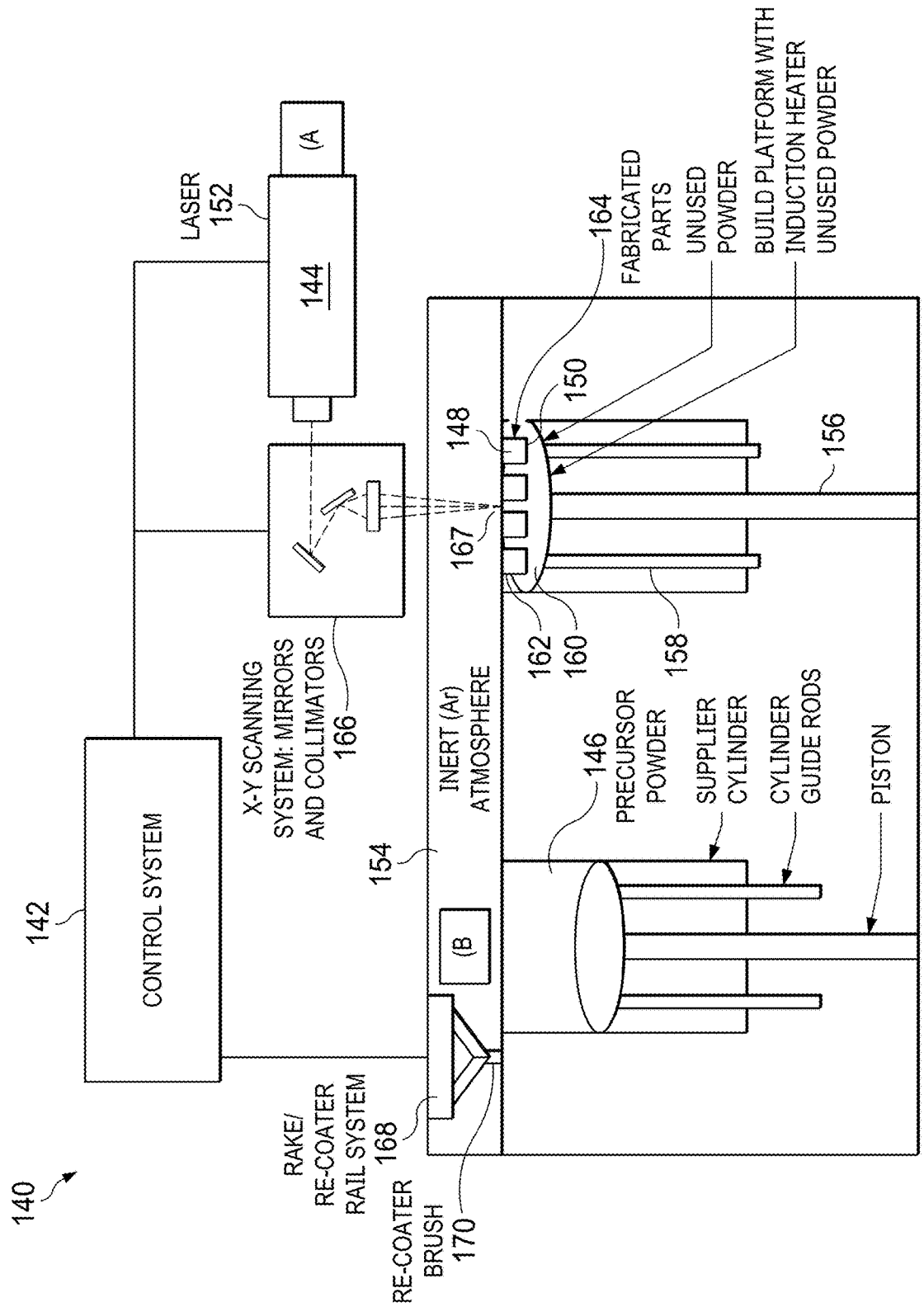
FIG. 1 is an illustration of a laser powder bed fusion system in accordance with an illustrative embodiment.

The particular values and configurations discussed in these non-limiting examples can be varied and are cited merely to illustrate at least one embodiment and are not intended to limit the scope thereof. The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A non-limiting example of laser welding with an elevated temperature is depicted in U.S. Pat. No. 5,554,837 entitled "Interactive Laser Welding at Elevated Temperatures of Superalloy Articles," which issued on Sep. 10, 1996, and is incorporated herein by reference.

Terminology referencing 3-D printing, as used herein, refers to a group of technologies defined by the following synonyms: additive manufacturing, rapid prototyping, additive layer manufacturing, layer manufacturing, or others defined by ASTM F42. Technology names (i.e., powder bed fusion, laser melting, directed energy deposition, binder jetting, electron beam melting, etc.) are all encompassed by 3-D printing as used herein.

The different illustrative embodiments recognize and take into account a number of different considerations. For example, the illustrative examples recognize and take into account that typical chemical composition limits of aluminum 6061 are set forth in ASTM B308/B308M. The typical chemical composition limits for AA6061 are Si 0.4-0.8, Fe 0.7, Cu 0.15-0.40, Mn 0.15, Mg 0.8-1.2, Cr 0.04-0.35, Zn 0.25, Ti 0.15, Other (each) 0.05, Other (total) 0.15, and Al is the remainder. The remainder is 95.85-98.56. Where each numerical value is a percentage by weight. For example, the alloy composition of AA6061 has a maximum 0.7% by weight of iron (Fe).

Where single units are shown, these indicate the maximum amounts permitted. Other includes all unlisted metallic elements. Total shall be the sum of unspecified metallic elements 0.010% or more, rounded to the second decimal before determining the sum.

The illustrative examples recognize and take into account that processing of AA6061 has been tried with powder bed LM, laser sintering (LS), and ultrasonic consolidation. The illustrative examples recognize and take into account that LS and LM are from the same genre, and LS could be considered as prologue to LM. The illustrative examples recognize and take into account that Laser processing of aluminum and its alloys has always been undesirably difficult. The illustrative examples recognize and take into account that laser processing of aluminum and its alloys is difficult because of at least one of the high reflectivity (e.g., R=0.75 at 1070 nm wavelength for aluminum) and low absorptivity of laser, high thermal conductivity, and high coefficient of thermal expansion.

The illustrative examples recognize and take into account that aluminum and its alloys are known for their reflectivity of lasers and relatively high thermal conductivity (around 167 W/m-K) when compared to the other common LM material (e.g., tool steel which has a thermal conductivity of 24.3 W/m-K at 215° C.). The illustrative examples recognize and take into account that the latent heat of fusion for aluminum (the energy required for melting) is the highest for any metal: 378 kJ/kg for Al versus 297 kJ/kg for Ni and 272 kJ/kg for Fe. The illustrative examples recognize and take into account that the corresponding latent heat of fusion/melting temperature is 0.59, 0.20 and 0.12 kJ/kg-° C. for Al, Ni and Fe, respectively. The illustrative examples recognize and take into account that applying sufficient energy in the laser-powder bed interaction zone and keeping that energy within the melting zone has been the challenge in processing non-variant AA6061 using LM.

The illustrative examples recognize and take into account that surface area is higher in powder when compared to flat sheets. The illustrative examples recognize and take into account that powder bed LM of precursor AA6061 is more challenging, and the chance of oxidation is greater because greater surface area enhances different transport phenomena. The illustrative examples recognize and take into account that moisture pick up of the aluminum alloy powder results in an increase of $H_2$ content in the powder. The illustrative examples recognize and take into account that both oxidation and hydrogen inclusion result in porosity within the fabricated part. The illustrative examples recognize and take into account that laser melting (LM) of AA6061 attempts found in the literature suffered from low relative density, high porosity and crack formation.

The illustrative examples recognize and take into account that some LM machines include heating elements for raising the temperature of the powder bed during fabrication. (i.e., start plate, un-melted powder, and laser melted powder) The illustrative examples recognize and take into account that heating capabilities range within LM machines, but generally can produce temperatures in the range of 200° C. to 1000° C. by using either resistance or induction coils.

The illustrative examples recognize and take into account that it would be desirable to identify processing for LM AA6061 such that fabricated parts do not exhibit cracking. The illustrative examples recognize and take into account that it would be desirable to identify processing for LM AA6061 such that fabricated parts have a high relative density.

The illustrative examples recognize and take into account that during solidification of many so-called high-performance engineering alloys, such as 6000 and 7000 series aluminum alloys, which are also unweldable autogenously, volumetric solidification shrinkage and thermal contraction produces voids and cracks. The illustrative examples recognize and take into account that during additive manufacturing processing, these defects can span the length of columnar grains, as well as intergranular regions.

The illustrative examples recognize and take into account that additive manufacturing (AM) is a material joining process used to make three dimensional objects directly from computer aided design (CAD) data by depositing subsequent layers as opposed to subtractive techniques. The illustrative examples recognize and take into account that AM is categorized in a group of technologies to build parts using polymers, metals, ceramics, and composites through processing of precursor materials that include liquid, powder, pellet, sheet, filament or wire.

The illustrative examples recognize and take into account that AM techniques offer several advantages over conventional manufacturing processes including: the reduction of lead times and costs by diminishing the need for part-specific tooling, the ability to produce high complexity parts such as those having thin features and conformal channels, and the reduction of precursor material wastage.

The illustrative examples recognize and take into account that laser powder bed fusion (LPBF) also known as selective laser melting (SLM) and direct metal laser sintering (DMLS) is a powder bed fusion AM technology that traces back to its prelude, selective laser sintering (SLS). The illustrative examples recognize and take into account that in LPBF, a high energy laser beam is guided by a galvanometer mirror scanner to selectively melt the precursor metal powder according to CAD data. The illustrative examples recognize and take into account that LPBF processing of titanium alloys, Inconel super alloys, steels, and some aluminum alloys such as AlSi10Mg and AlSi12Mg has been reported.

The illustrative examples recognize and take into account that powder bed LM process could be regarded as a faster version of fusion welding given that in both cases full melting occurs in the fusion zone. The illustrative examples recognize and take into account that high crack susceptibility of aluminum stems from the high solidification stresses sustained by the melt pool. The illustrative examples recognize and take into account that in powder bed LM, a much smaller layer thickness is used. On the other hand, fusion welding uses much thicker layers of sheet, in the range of 1 to 30 mm, at a relatively slower rate of 16 to 160 mm/s. The illustrative examples recognize and take into account that therefore, the transient nature of the melt pool would be more dominant in the LM powder bed process than welding, hence a higher residual stress and subsequent cracking. The illustrative examples recognize and take into account that in welding, filler material could be introduced to change weld pool chemistry to deter cracking, which is also not possible in LM because maintaining purity of the fabricated parts is often required by the end-use application.

The illustrative examples recognize and take into account that AA6061 has been a difficult alloy to process using LPBF because of high crack sensitivity of the material during solidification. The illustrative examples recognize and take into account that solidification cracking of Al—Si—Mg alloy systems is widely discussed in the welding literature.

The illustrative examples recognize and take into account that large difference between the solidus and liquidus temperatures (solidification range) of an alloy, the retardation of liquid transport phenomena to the shrinkage area due to complex dendritic network in the mushy zone, and the lack of eutectic points for a given alloy are some of the metallurgical factors in solidification cracking. The illustrative examples recognize and take into account that surface tension of the liquid metal affects solidification cracking by driving wettability of grain boundaries and inter dendritic liquid metal flow.

The illustrative examples recognize and take into account that a conventional method for welding AA6061 products is to use filler metals from the silicon rich 4000 series aluminum alloys or the magnesium rich 5000 series aluminum alloys.

The illustrative examples recognize and take into account that in some previous processes, delamination, and low relative density (89.5%) occurs when AA6061 is processed using LPBF. The illustrative examples recognize and take into account that the formation of an oxide film may contribute to the delamination and low relative density of AA6062 processed using LPBF in conventional processes.

The illustrative examples recognize and take into account that AA6061 has been found to be highly crack susceptible when fabricated with LPBF technology. The illustrative examples recognize and take into account that crack formation during LPBF processing of pre-alloyed AA6061 may be directly related to the high coefficient of thermal expansion, and a large melting range of the material.

The illustrative examples recognize and take into account that LPBF fabrication of an unalloyed mixture of aluminum (Al), and silicon (Si) powders in the same proportions as in nominal AA6061 has been performed. The illustrative examples recognize and take into account that this approach has reduced cracks in the microstructure but did not fully eliminate cracking. The illustrative examples recognize and take into account that an elemental mixture that does not include all the alloying elements of AA6061, is a fundamentally different precursor material compared to a pre-alloyed powder. The illustrative examples recognize and take into account that the mechanical properties of fabricated parts manufactured using an unalloyed mixture of Al and Si may not have the same material properties as the wrought AA6061 properties.

The illustrative examples recognize and take into account that the introduction of foreign particles such as Zr in the AA6061 and AA7075 would require the modified materials to be requalified and certified for aerospace and other critical applications. The illustrative examples recognize and take into account that functionalization of the precursor powders by Zr nanoparticles requires an additional procedure consisting of an electrostatic assembly technique that could incur added processing costs. The illustrative examples recognize and take into account that previous strategies in the literature have yet to achieve fabrication of crack-free, and nearly fully dense components using pre-alloyed and unmodified AA6061 powder that also have desirable mechanical properties.

The illustrative embodiments present methods for creating crack-free LM AA6061 parts. The illustrative embodiments present methods including the use of induction heating to heat the powder bed prior to and during laser melting.

The illustrative examples recognize and take into account that several other aluminum alloys produce cracking in additive manufacturing processes. The illustrative examples recognize and take into account that the disclosed processing parameters may be used in other aluminum alloys to eliminate cracking due to large differences between the solidus and liquidus temperatures (solidification range) of an alloy. For example, the illustrative examples recognize and take into account that processing of AA2014, AA2017, AA2024, AA2219, AA5083, AA7050, AA7075, AA7150, AA7178, and AA7475 may also produce cracking or other undesirable properties during laser powder bed fusion. The illustrative examples recognize and take into account that processing of AA2014, AA2017, AA2024, AA2219, AA5083, AA6061, AA7050, AA7075, AA7150, AA7178, and AA7475 according to the disclosed parameters accounts for the large differences in melting temperatures within these alloys.

The illustrative embodiments present methods for heating of the powder bed to process crack-free, and nearly fully dense AA6061 parts using LPBF. As used herein, nearly fully dense parts have a relative density of about 95% or greater. The illustrative embodiments present methods for high temperature preheating of the powder bed to control the solidification rate of the melted AA6061 in the laser-powder interaction zone, without modification of the chemical content of the commercially available AA6061 powder. The illustrative embodiments present methods for heating using an induction heater. The elevated temperature of the powder bed reduced the solidification rate ensuring a more congruent solidification to eliminate hot tearing.

Characterization using optical microscopy (OM) of LPBF produced AA6061 coupons according to the illustrative embodiments revealed the presence of well dispersed and large size precipitates. Also evident in the micrographs was the absence of melt-pool and melt-tracks that are characteristic of LPBF processing. The following more completely describes the illustrative embodiments demonstrating crack-free fabrication of AA6061 using LPBF with high-temperature powder bed heating.

Turning now to FIG. 1 is an illustration of a laser powder bed fusion system in accordance with an illustrative embodiment. In some illustrative examples, laser powder bed fusion system 140 may also be referred to as a fabrication system or an additive manufacturing device. Laser powder bed fusion system 140 comprises a control system 142 for the additive manufacturing device. Laser powder bed fusion system 140 includes an energy source 144, powder supply 146, build area 148, and heating element 150. Control system 142 can comprise a computer, and/or computer module capable of controlling a dynamic system of actuators with multiple motion axes, multiple energy source actuation, heating element output, and powder deposition mechanisms.

Laser powder bed fusion system 140 is equipped with laser 152 as energy source 144. In some illustrative examples, laser 152 is a 1 kW laser (Gaussian beam profile). In some illustrative examples, energy source 144 is an yttrium fiber laser with a 1 μm wavelength (other wavelengths can be used in other embodiments) capable of continuous output and modulation. In one specific implementation, laser 152 is a Nd-YAG 1 kW class 4 laser operating in the near infrared spectrum ($\lambda$=1030 nm). In other embodiments, energy source 144 can comprise other laser types and wavelengths, induction/electro-magnetic flux, or electron beams.

Laser powder bed fusion system 140 includes a hopper or supply platform 146 that supplies an aluminum alloy precursor powder 162 to build area 148. Build chamber 154 is fed with argon inert gas, an induction coil to heat the powder bed, and a fume extraction system. Piston 156 with cylinder guide rods 158 and supplier cylinders can be used to adjust plate 160. Plate 160 (e.g. a metal plate) can be used as the base or substrate for the fabrication process, and is positioned within build area 148 and surrounded by aluminum alloy precursor powder 162. With build area 148 populated with aluminum alloy precursor powder 162, energy source 144 (e.g. a laser) selectively melts the aluminum alloy precursor powder 162 in order to solidify the powder into a desired shape, resulting in a fabricated part 164, a crack-free aluminum alloy structure.

Heating element 150 is included to control the temperature of the aluminum alloy precursor powder 162 and consolidated material in build area 148. Heating element 150 can comprise an inductive heating configuration, microwave, or can be resistive based heating elements. Furthermore, laser beams or electron beams can be used in combination with heating element 150 to achieve full thermal control. Scan strategies, power modulation and dynamic parameter variations of the energy source 144 (laser and/or electron beam) provide means to more precisely control the powder/part temperature. Heating element 150 can be applied directly to the part bed/or conduction heating can be provided from below the build platform 160.

An optical pyrometer, infrared imaging (IR camera), thermocouples, separately or in combination can be used to monitor and control powder temperature. A multi-wavelength pyrometer is preferred removing emissivity dependency on temperature readings. The heating temperature is most preferably within 50° C. above the solidus temperature and 30° C. below the liquidus temperature of the material being processed, although other temperatures can be used according to design considerations.

The implementation of the powder bed heating reduces the laser power demand since the aluminum alloy precursor powder 162 is already at an elevated temperature state and less energy is required to melt the metal. If less laser power is required, as compared to a system that does not include a heated powder bed, the occurrence of splatter (i.e., powder particles ejected from the laser processing area) is reduced. In this fashion, powder is used more efficiently since it is not splattered and damaged by a high power laser, which leads to powder waste.

X-y scanning system 166, which can include mirrors and collimators, can be used to direct laser 152 (or other energy source) onto the precursor powder 162 in the desired pattern. The system can also include a rake/re-coater rail system 168 and recoater brush 170, rake or squeegee. In some illustrative examples, crack-free aluminum alloy structure comprises spreading the aluminum alloy powder by a back and forth movement of a rake tipped with carbon fiber brushes within the laser powder bed fusion system.

During fabrication of a desired shape or part, control system 142 can be provided a set of desired parameters (i.e. source scan speed, emitted power, layer thickness, number and type of scans per layer, powder temperature, hatch spacing, source focus, etc.) for the shape desired. Parameters are selected based on desired microstructure. In some illustrative examples, the parameters are varied spatially to create graded or gradient microstructures specific to the formation of precipitates and grain morphology within the material. The control system 142 implements and controls the fabrication according to the desired parameters.

The overall focal length of the laser energy exiting X-y scanning system 166 is continuously adjusted through dynamically positioned diverging optics of x-y scanning system 166. Such adjustment of focal length enables the laser beam focus to remain constant on the build plane 167.

An important characteristic of laser powder bed fusion system 140 was the ability to heat the powder bed. In some illustrative examples, heating element 150 is an induction setup configured to enable heating of the powder bed to a maximum of ~1000° C. The laser module 152, induction generator 150, and a transformer (not depicted) use any desirable type of cooling. In some illustrative examples, laser module 152, induction generator 150, and a transformer utilize water cooling. In some illustrative examples, components of laser powder bed fusion system 140 are air cooled. For example, laser 152 could be air cooled when operated at or below 400 W of power.

Parameters applied to laser powder bed fusion system 140 comprise the combination of heating temperature, layer thickness, hatch spacing, laser power, and scanning speed. In some illustrative examples, the parameters applied to laser powder bed fusion system 140 comprise 350° C. to 500° C. heating. In some illustrative examples, the parameters applied to laser powder bed fusion system 140 comprise 450° C. to 500° C. heating. In some illustrative examples, the parameters applied to laser powder bed fusion system 140 comprise about 500° C. heating.

In some illustrative examples, the parameters applied to laser powder bed fusion system 140 comprise the combination of 350° C. to 500° C. heating, 70-100 μm layer thickness and 80 μm to 140 μm hatch spacing. In some specific illustrative examples, the parameters applied to laser powder bed fusion system 140 were the combination of 500° C. heating, 70-100 μm layer thickness, and 140 μm hatch spacing. In some illustrative examples, the parameters applied to laser powder bed fusion system 140 included 400 W laser power and 1400 mm/s scanning speed. The application of these parameters resulted in crack-free fabrication of cubic coupons. In some illustrative examples, larger layer thicknesses may be used. In these illustrative examples, other parameters such as at least one of scanning speed, laser power, or laser hatch spacing is also adjusted to prevent porosity.

As used herein, the phrase "at least one of", when used with a list of items, means different combinations of one or more of the listed items may be used and only one of each item in the list may be needed. In other words, "at least one of" means any combination of items and number of items may be used from the list, but not all of the items in the list are required. The item may be a particular object, a thing, or a category.

For example, "at least one of item A, item B, and item C" may include, without limitation, item A, item A and item B, or item B. This example also may include item A, item B, and item C or item B and item C. Of course, any combination of these items may be present. In other examples, "at least one of" may be, for example, without limitation, two of item A, one of item B, and ten of item C; four of item B and seven of item C; or other suitable combinations.

To begin fabrication using laser powder bed fusion system 140, build platform 160 is lowered by a distance equal to that of the layer thickness. Supplier powder bed 146 is raised by a height multiple of the layer thickness depending upon the supply factor to ensure enough supply of powder 162. The supply factor has any desirable value. In some illustrative examples, a supply factor of three is used. Powder spreading was carried out by back and forth movement of a rake tipped with carbon fiber brushes 170 to withstand the high temperature of the build platform 160 when the induction heater was used.

In some illustrative examples, during the fabrication process, an $O_2$ sensor (not depicted) continuously monitors the $O_2$ level of process chamber 154 in parts per million (ppm). It is desirable to maintain a low oxygen concentration during fabrication to reduce oxide formation on a part. In some illustrative examples, the $O_2$ level is maintained below 500 ppm throughout the fabrication process to reduce the oxide formation. In some illustrative examples, the $O_2$ level is maintained below 200 ppm throughout the fabrication process to reduce the oxide formation. However, these are non-limiting examples, in some illustrative examples, the $O_2$ level is maintained below 400 ppm, 300 ppm, or other desirable level throughout the fabrication process to reduce the oxide formation.

TABLE 1

Range of LPBF parameters explored to find the crack-free parameter combination

| Powder bed temperature (° C.) | Layer thickness (µm) | Hatch Spacing (µm) | Power (W) | Scan speed (mm/s) |
|---|---|---|---|---|
| 350-500 | 30-100 | 80-140 | 150-500 | 500-2800 |

Figure 2:
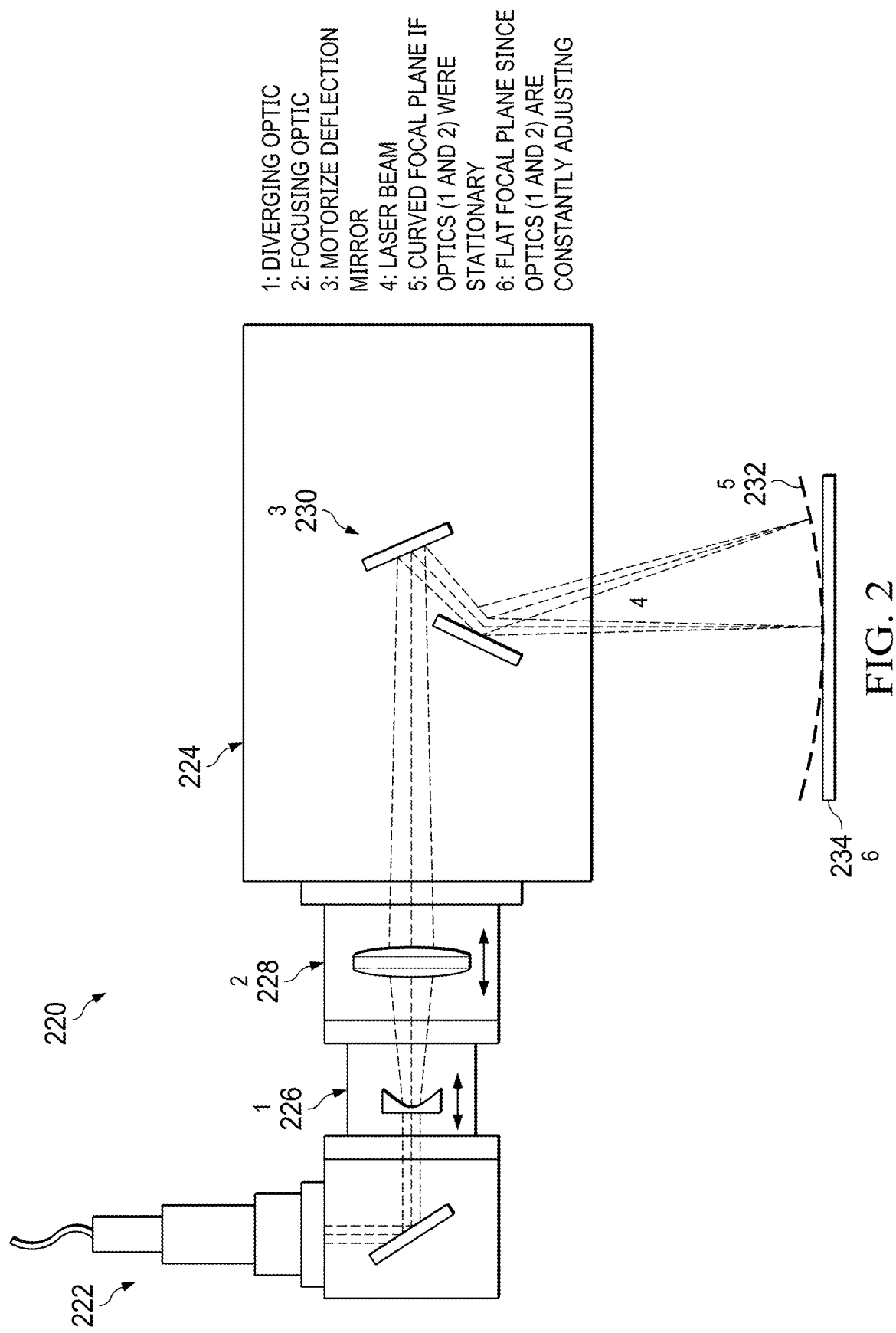
FIG. 2 is an illustration of a scan-head of laser powder bed fusion system in accordance with an illustrative embodiment.

Turning now to FIG. 2, an illustration of a scan-head of laser powder bed fusion system is depicted in accordance with an illustrative embodiment. Scan head 220 is an implementation of energy source 144 and x-y scanning system 166 of FIG. 1. Energy from energy source 222 is directed using x-y scanning system 224 which can include mirrors and collimators can be used to direct the laser (or other energy source) onto the precursor powder in the desired pattern.

As depicted, x-y scanning system 224 comprises diverging optic 226, focusing optic 228, and motorized deflection mirror 230. Curved focal plane 232 is representative of the focal plane if optics, diverging optic 226 and focusing optic 228, were stationary. Flat focal plane 234 is representative of the focal plane if optics, diverging optic 226 and focusing optic 228, are constantly adjusting.

The overall focal length of scan head 220 is continuously adjusted through dynamically positioned diverging optics. Such adjustment of focal length enables the laser beam focus to remain constant on the build plane, such as build plane 167 of FIG. 1.

Figure 3:
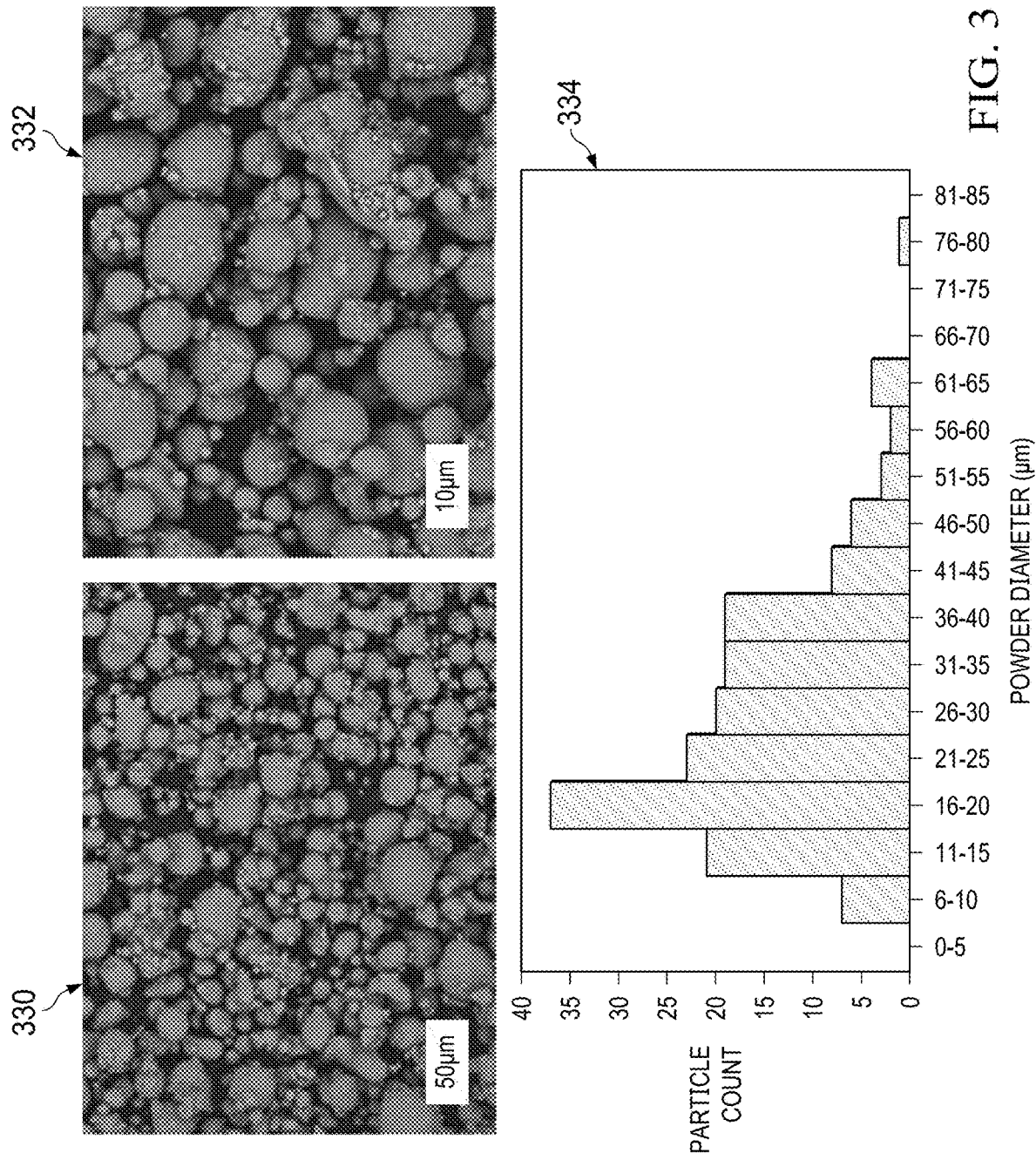
FIG. 3 is an illustration of a scanning electron microscope (SEM) image of and histogram of particle sizes for AA6061 powder in accordance with an illustrative embodiment.

Turning now to FIG. 3, an illustration of a scanning electron microscope (SEM) image of and histogram of particle sizes for AA6061 powder is depicted in accordance with an illustrative embodiment. Image 330 and image 332 are SEM images of the aluminum alloy precursor powder. As can be seen in image 330 and image 332, the powder morphology of the AA6061 powder used is predominantly spheroidal and semi-spherical with satellites. Some irregular shaped or flake powder are also observed in image 330 and image 332.

In some illustrative examples, the particle size range, which influences packing density, is within 20 to 63 µm. As can be seen in histogram 334, in some illustrative examples, a batch of powder may have a slightly skewed normal distribution with mean powder size of 27 µm. In some illustrative examples, such as in histogram 334, powder distribution is skewed towards the finer particles. In other illustrative examples, powder distribution is skewed towards larger particles.

The published range of apparent density of AA6061 powder is 0.8-1.3 g/cm³. Besides the standards already mentioned, the powder characterization for AA6061 adheres to the definitions in ASTM F3049-14.

Figure 4:
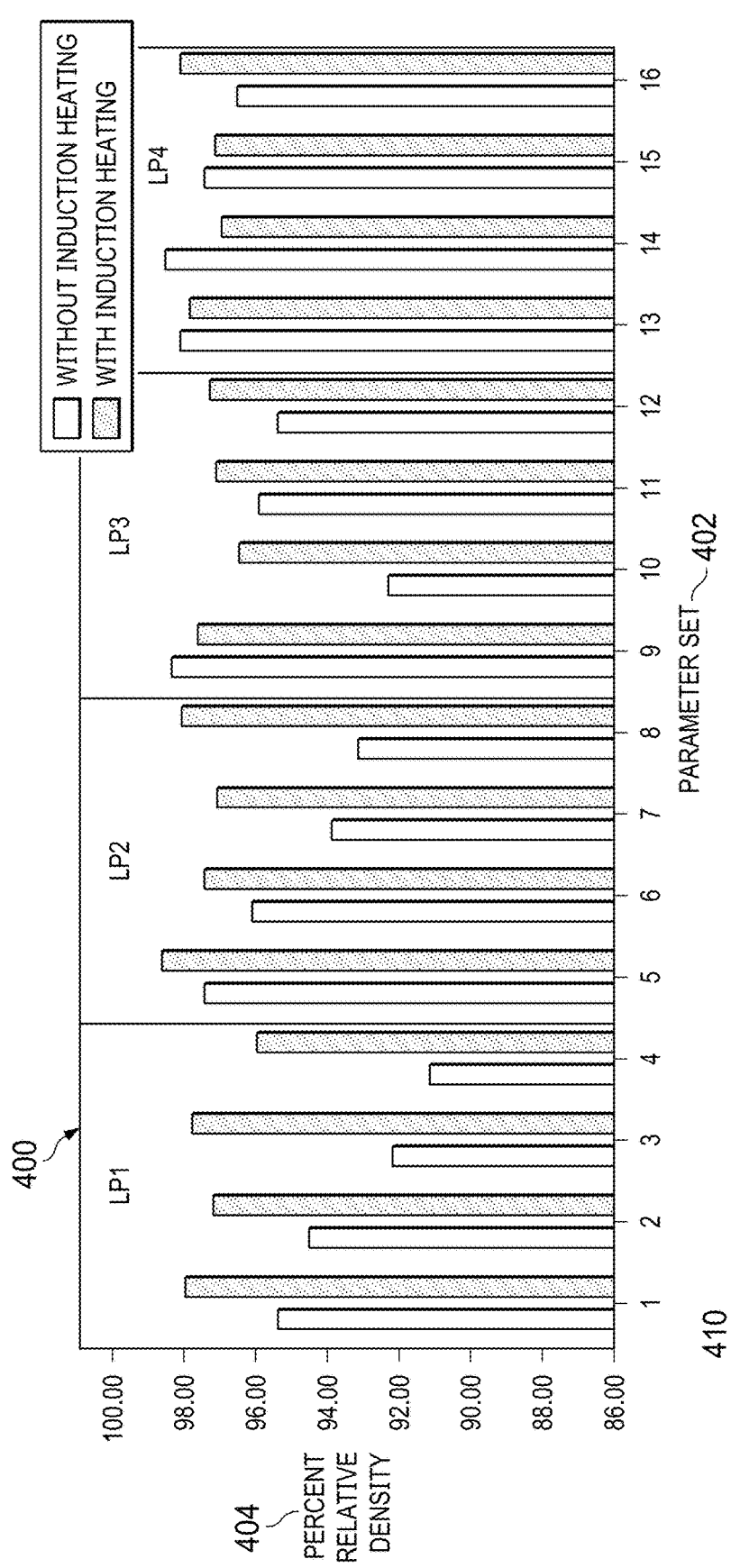
FIG. 4 is an illustration of a graph of relative density of AA6061 cube coupons fabricated using different laser power and scanning speeds in accordance with an illustrative embodiment.

Turning now to FIG. 4, an illustration of a graph of relative density of AA6061 cube coupons fabricated using different laser power and scanning speeds is depicted in accordance with an illustrative embodiment. Percent relative density values in graph 400 were calculated by dividing the LPBF fabricated AA6061 density by the nominal density of AA6061, which is 2.7 g/cm³.

Graph 400 has x-axis 402 that represents a parameter set for manufacturing a given aluminum alloy structure. Graph 400 has y-axis 404 that represents percentage relative density. Graph 400 is divided into groups LP1, LP2, LP3, and LP4. Groups LP1, LP2, LP3, and LP4 are divided based on parameters, such as laser power 406 and scanning speed 408 as depicted in chart 410.

As can be seen in graph 400, during fabrication without the induction heater, the maximum measured relative density was 98.50% and the range was 7.31%. As can be seen in graph 400, with the induction heater, the maximum relative density was 98.7% and the range was 2.63%.

The results depicted in graph 400 indicate that with the use of induction heating, not only was the maximum relative density increased, but the range was decreased. The results depicted in graph 400 further indicate that induction heating enables higher densities even when operating within a larger parameter space. Quantitatively, the range was decreased by 4.68% (or 64% reduction) when the induction heater was implemented.

The results depicted in graph 400 further indicate when the induction heater was not used, the highest relative density (98.50%) was measured when the energy density was 22.3 J/mm³. The specimens having the highest relative density when the energy density was 22.3 J/mm³ contain microcracks observed through micrographs.

The results depicted in graph 400 illustrate that for specimens without bed heating by the induction heater, the relative density was observed to decrease consistently at each power setting with increasing speed. The results depicted in graph 400 illustrate that the highest relative density (98.7%) was achieved with the induction heating of the powder bed and energy density of 20.40 J/mm³.

As will be discussed below, the use of induction heating resulted in crack-free part for every parameter combination. For specimens at laser power-1 (LP1) and LP2, the specimens built with induction heating had higher relative density, in every laser power and scanning speed combination. In the same laser power groups, the relative density was at least 1.2% higher when the induction heater was used. In addition, the highest observed difference in relative density was 5.5%. Except in the LP4 group and in parameter set 9 for LP3, the relative density was higher when using the induction heater. The specimens built with the induction heater do not contain cracks within the microstructure-previously unachieved for powder bed laser melting of AA6061.

Figure 5:
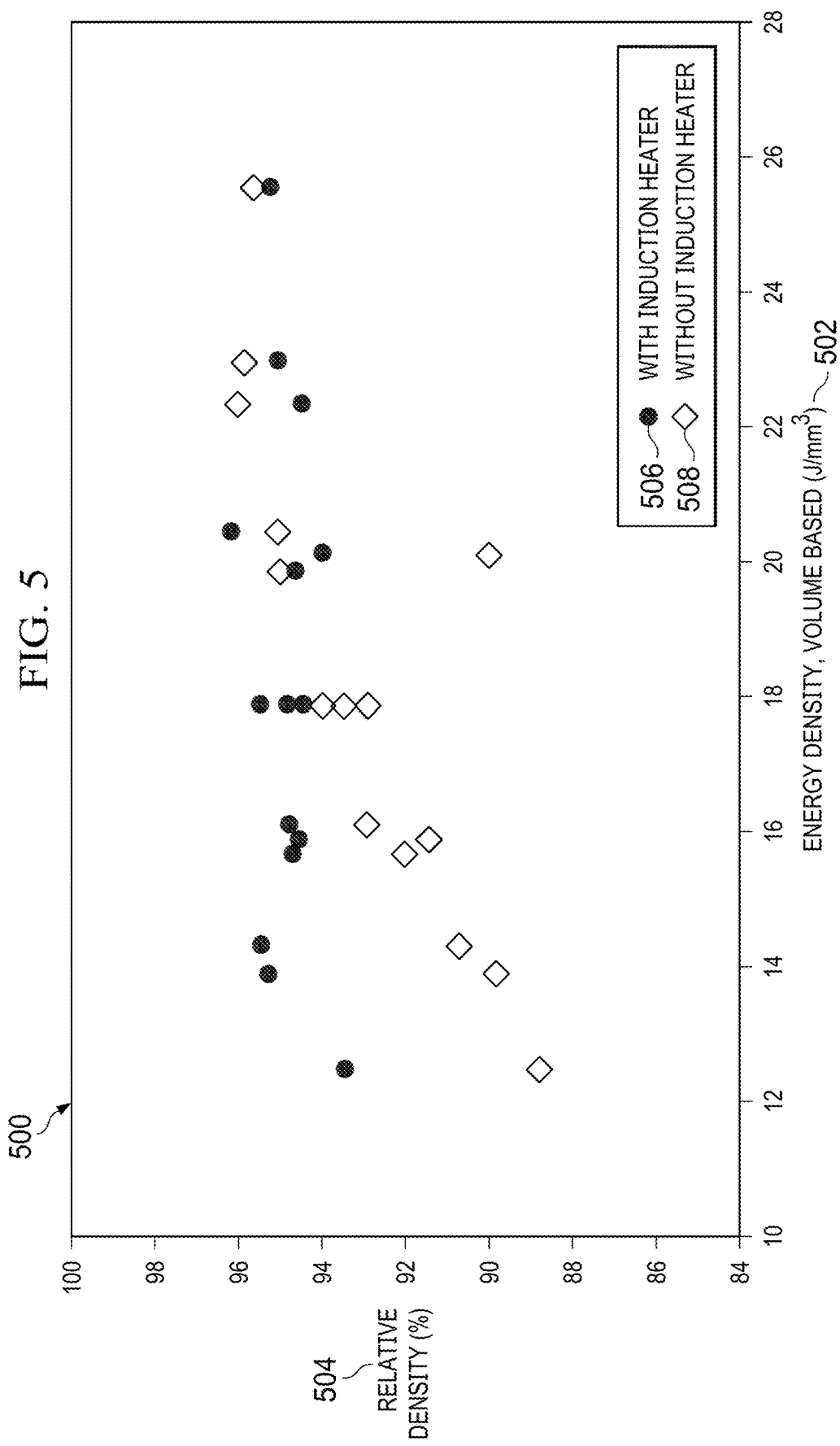
FIG. 5 is an illustration of a graph of relative density as a function of energy density spectra for AA6061 fabricated with and without heating of the powder bed in accordance with an illustrative embodiment.

The volume-based energy density was calculated using the following equation:

$$E = \frac{P}{(v*h*t)}$$

where E is expressed in J/mm³, P is the laser power, v is the scanning velocity, h is the hatch spacing, and t is the layer thickness. FIG. 5 reports the relative density data sets presented in FIG. 4 as a function of energy density. While the induction heater's contribution to energy density was not included in these calculations, the energy density (provided only by the laser) is still presented to demonstrate the data trends and provide a comparison between the two fabrication conditions (i.e., with and without induction heater).

Turning now to FIG. 5, an illustration of a graph of relative density as a function of energy density spectra for AA6061 fabricated with and without heating of the powder bed is depicted in accordance with an illustrative embodiment. Graph 500 has x-axis 502 representing energy density in J/mm$^3$. Graph 500 has y-axis 504 representing relative density. Graph 500 includes data points for structures manufactured with induction heater 506 and structures manufactured without induction heater 508.

As depicted in graph 500, when the induction heater was not used, the relative density had an increasing trend (minus one outlier value) when energy density increases. When the induction heater was used, the relative density was comparatively constant. As can be seen in graph 500, the general increasing trend for the specimens fabricated without the induction heating of the powder bed appear to approach the data set of the specimens fabricated with the induction heating of the powder bed.

The entire data set (all power and scanning speed combinations) for the specimens fabricated with induction heating averaged a relative density of 97.43% (n=16, $\sigma$=0.66), whereas the data set for the specimens fabricated without the induction heating averaged 95.40% (n=16, $\sigma$=2.26). Although the relative density is not as high as some reported for other materials, the average and standard deviation for the "with induction heater" specimens demonstrate the reduction of standard deviation by implementing the induction heater.

Figure 6:
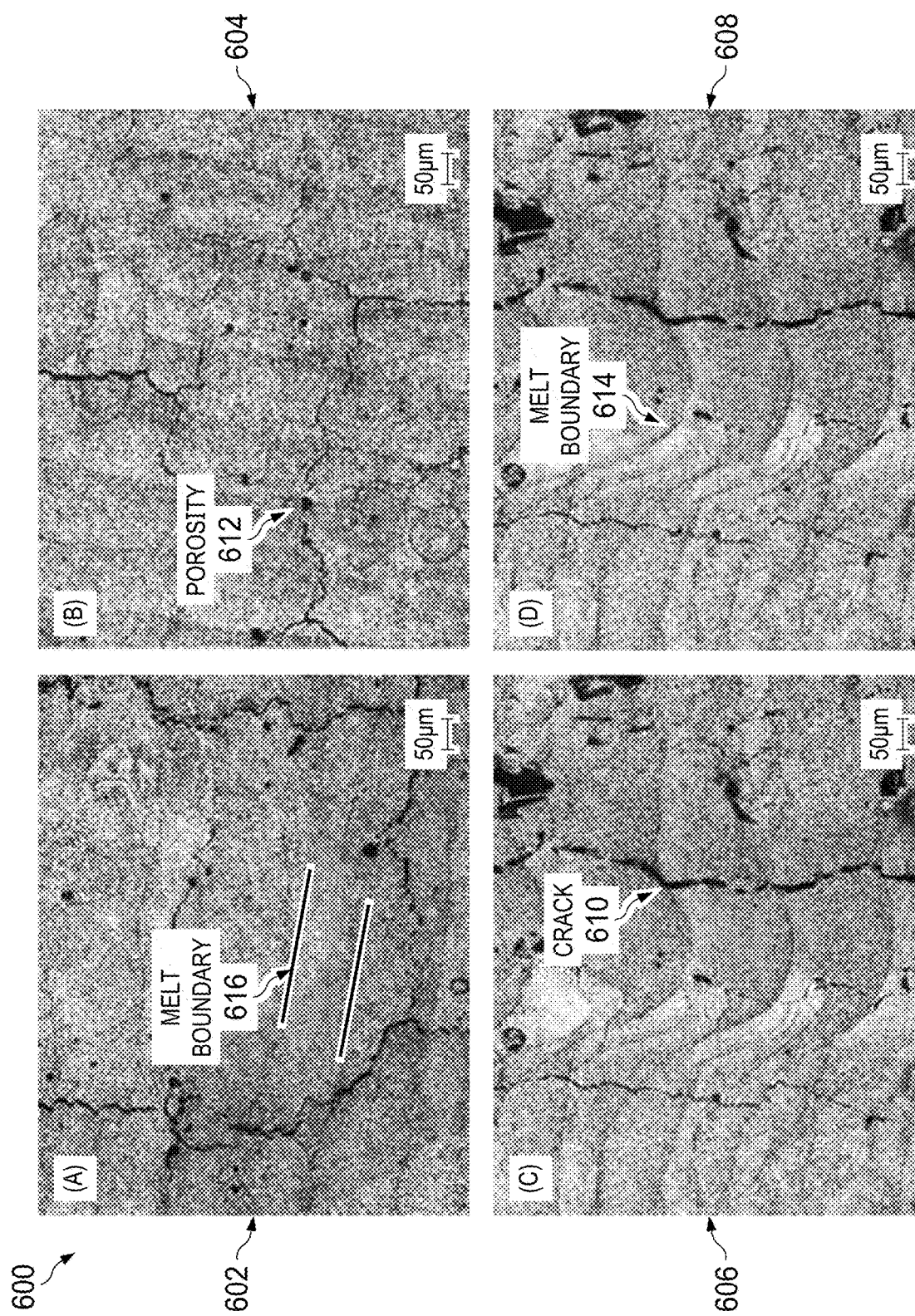
FIG. 6 is an illustration of the microstructure of AA6061 specimens fabricated on an unheated powder bed in accordance with an illustrative embodiment.

Turning now to FIG. 6, an illustration of the microstructure of AA6061 specimens fabricated on an unheated powder bed is depicted in accordance with an illustrative embodiment. A specimen shown in the micrographs of FIG. 6 may be manufactured on laser powder bed fusion system 140 without activating heating element 150.

Image 602 and image 604 correspond to the ZX plane of a specimen. Image 606 and image 608 correspond to the XY plane of a specimen.

The micrographs shown in FIG. 6 reveal large cracks in the microstructure in both planes. For example, crack 610 is shown in image 606. In addition to the high occurrence of cracks, a higher than desired degree of porosity can be seen. For example, porosity 612 is visible in image 604. The spherical shape of porosity 612 is indicative of gas porosity that could be formed by entrapped process gas, degassing of the metal powder, or porosity inherent in the metal powder during atomization.

The presence of crescent shaped melt pools and banding of melt tracks are apparent in these micrographs. For example, melt pool 614 is visible in image 608. Melt track 616 is visible in image 602. These melt-pool and melt tracks features are typical of LPBF fabricated microstructures in various material systems.

Figure 7:
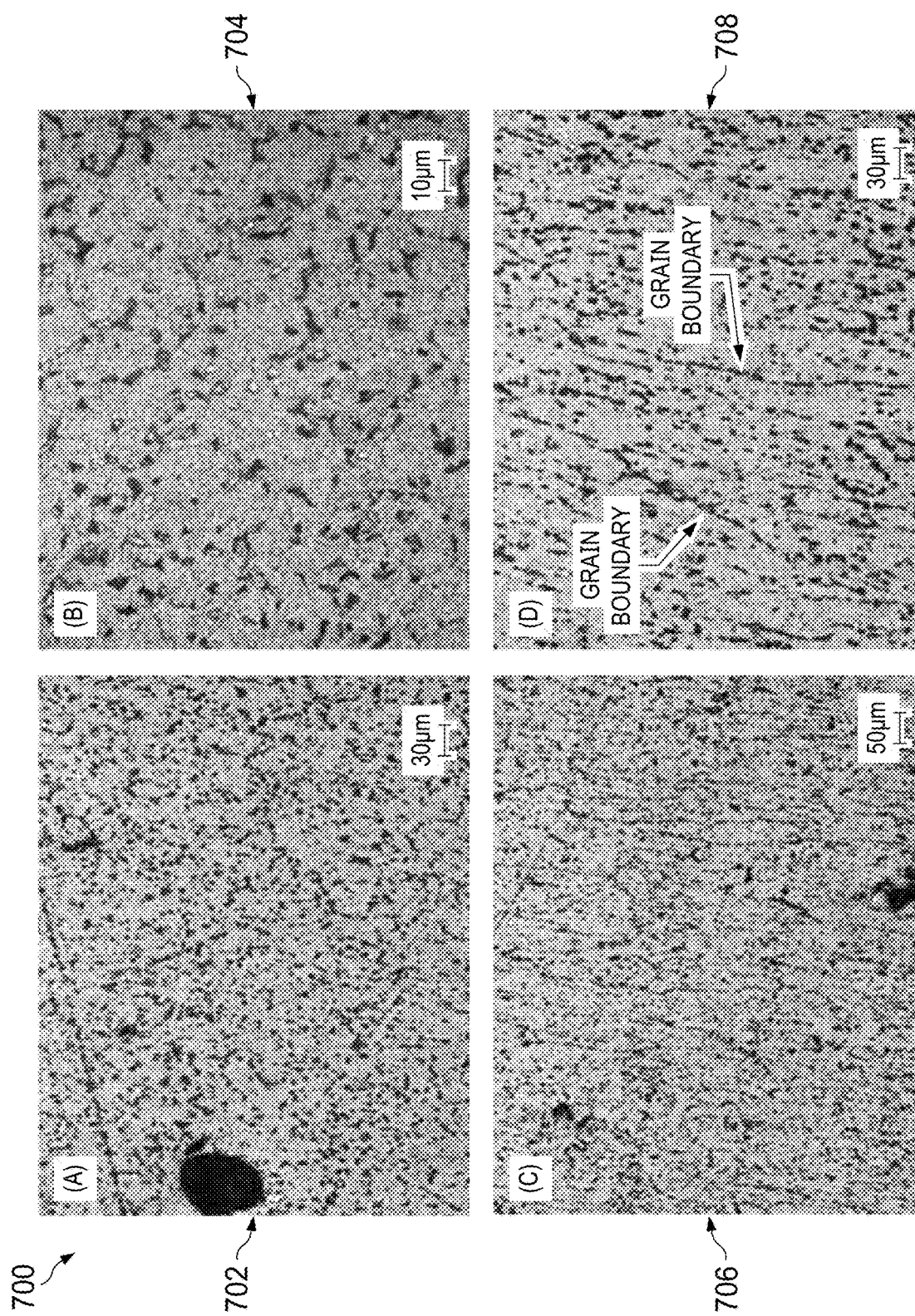
FIG. 7 is an illustration of the microstructure of AA6061 fabricated on a power bed heated to 500 degrees Celsius (° C.) in accordance with an illustrative embodiment.

Turning now to FIG. 7, an illustration of the microstructure of AA6061 fabricated on a power bed heated to 500 degrees Celsius is depicted in accordance with an illustrative embodiment. A specimen shown in the micrographs of FIG. 7 may be manufactured on laser powder bed fusion system 140 while heating element 150 is activated.

Image 702 and image 704 correspond to the ZX plane of the structure. Image 706 and image 708 correspond to the XY plane of the structure.

In contrast to the images in FIG. 6 the micrographs of image 702, image 704, image 706, and image 708 show no cracks and greatly reduced porosity overall. Additionally, in image 706 and image 708, the characteristic melt-pool banding shown in image 608, and a normal solidification feature of LPBF, has been eliminated. The elimination of the melt-pool banding is indicative of significant solidification process modification resulting from the powder bed heating.

Traditional, elongated (and ellipsoidal) grains are observed in the build direction as shown in image 706 and image 708. The elongated grains have average lengths of roughly 0.4 mm and widths of ~40 µm (a 10/1 ratio of length to width). In image 706 and image 708 there is a propensity of precipitates within the grain boundaries that appear somewhat homogeneously distributed throughout the matrix. The columnar grain boundaries decorated with precipitates are indicated with arrows in image 708.

Figure 8:
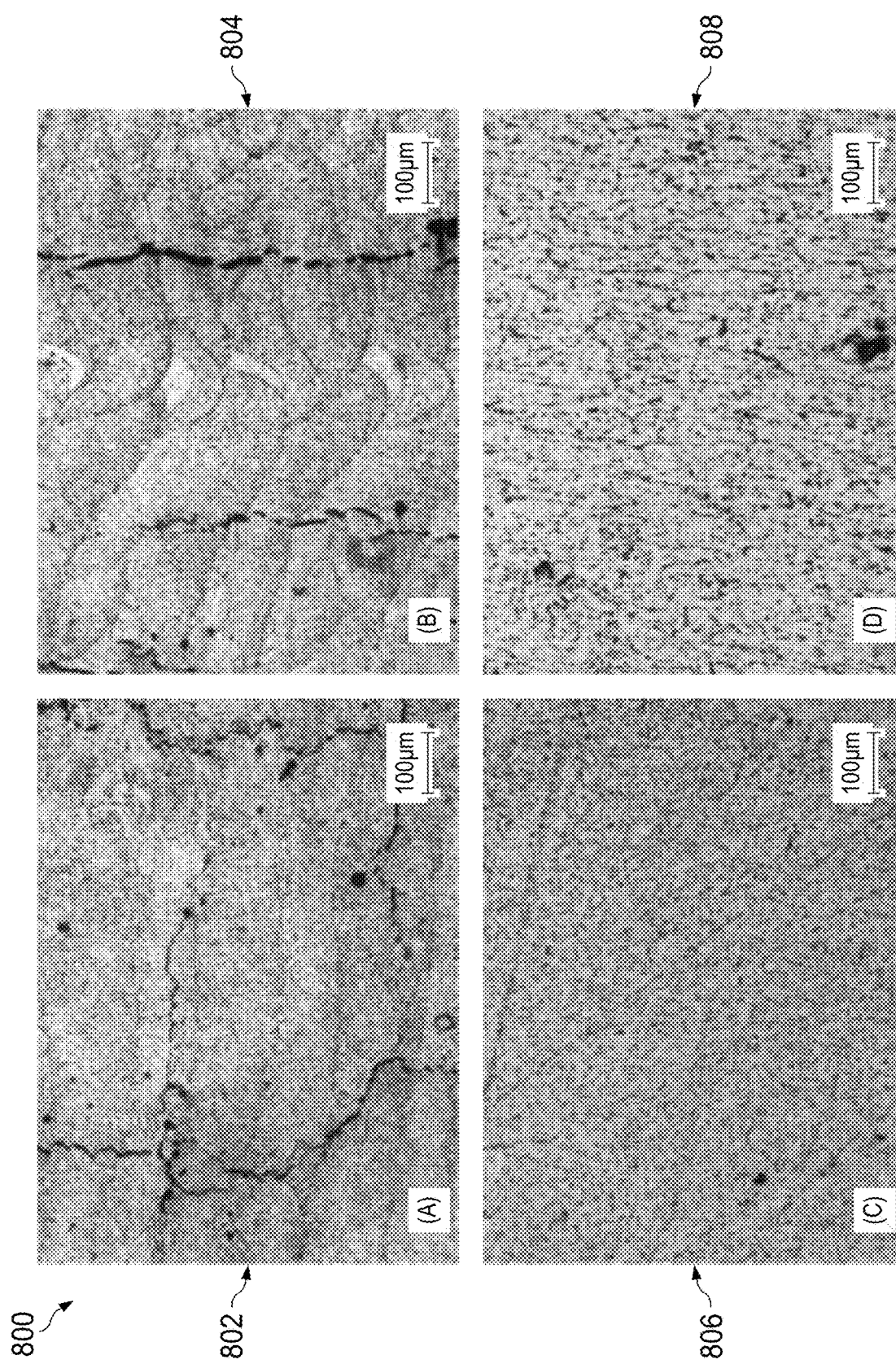
FIG. 8 is an illustration of the microstructure of AA6061 fabricated on either an unheated powder bed or a powder bed heated to 500 degrees Celsius in accordance with an illustrative embodiment.

Turning now to FIG. 8, an illustration of the microstructure of AA6061 fabricated on either an unheated powder bed or a powder bed heated to 500 degrees Celsius is depicted in accordance with an illustrative embodiment.

Image 802 and image 804 of FIG. 8 are optical light microscopy images of specimens fabricated without any induction bed heating. Image 802 and image 804 are optical light microscopy images of the horizontal and vertical planes of the specimens built without any induction heating of the powder. Image 802 and image 804 depict cracks in the microstructure for the AA6061 cubes fabricated without any bed heating. Heat affected zones, also identified as melt pools and tracks, are visible in both image 802 and image 804. Porosity is also observed in image 802 and image 804 for specimens fabricated without induction heating of the powder bed. The porosity can be correlated with the lower density measurements obtained for those parts.

Image 806 and image 808 are micrographs of specimens fabricated with induction heating of the powder bed. As can be seen in image 806 and image 808, cracks are not present. As can be seen in image 806 and image 808, heat affected zones, also identified as melt pools and tracks, are not present.

As can be seen from image 806 and image 808, crack-free parts are produced when using the induction heater to raise the powder bed temperature. As can be seen from image 806 and image 808, columnar or elongated grains are observed in the build direction. Elongated grains would result in anisotropy of properties. However, correct orientation of the elongated grains would improve mechanical property in that direction.

Induction heating of powder bed improved part quality by reducing porosity. Image 806 and image 808 showed a noticeable reduction in the number of pores in the microscopic images, when compared to image 802 and image 804. Porosity is not removed completely from image 806 and image 808.

Figure 9:
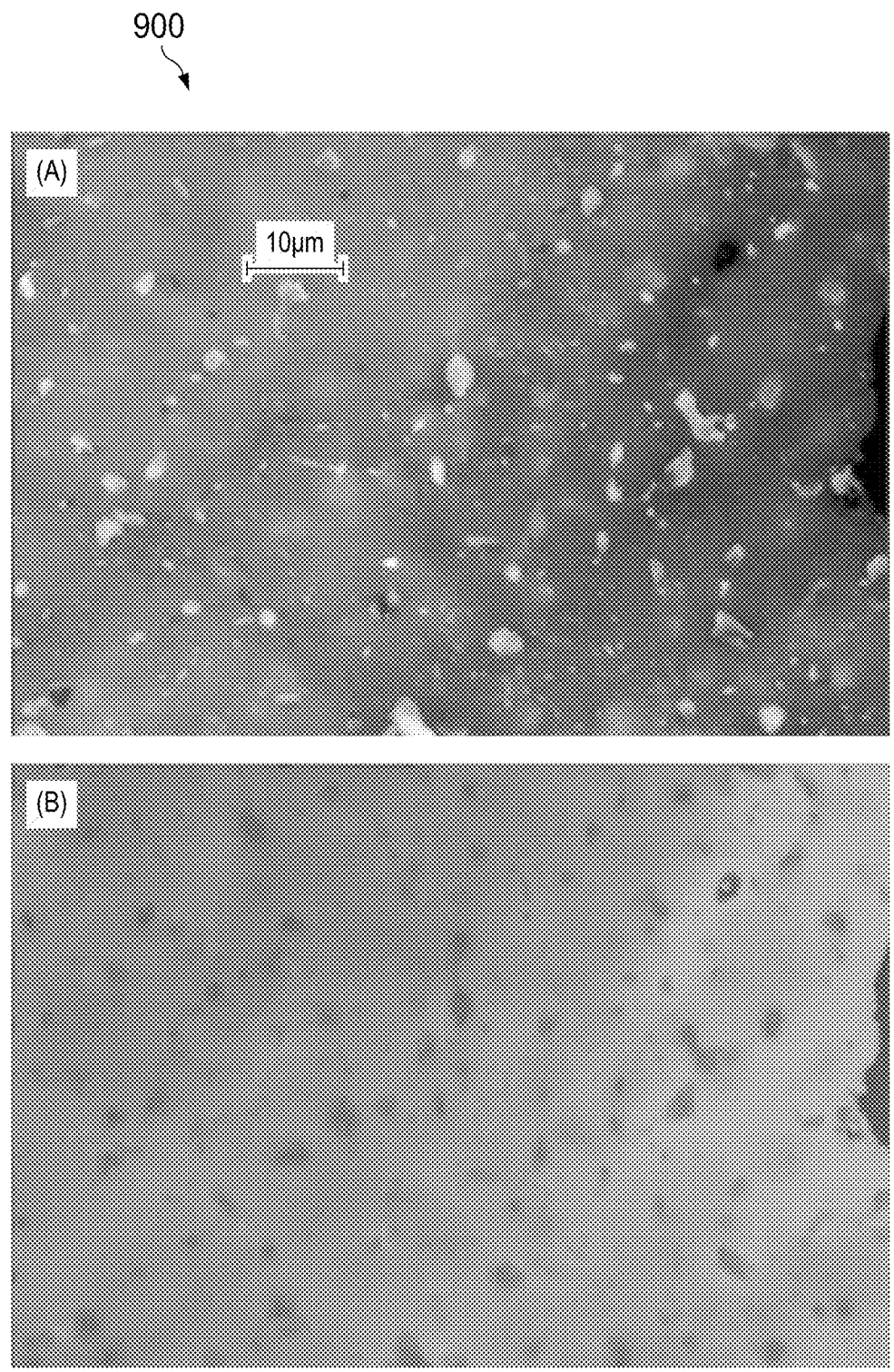
FIG. 9 is an illustration of SEM and STEM images of primarily Al—Si—O noncoherent precipitates within FIG. 6 in accordance with an illustrative embodiment.

Turning now to FIG. 9, an illustration of SEM and STEM images of primarily Al—Si—O noncoherent precipitates within FIG. 7 in accordance with an illustrative embodiment. As shown in FIG. 9, these precipitates appear to be noncoherent dispersoids, having sizes ranging from ~200 nm to as large as 5 µm, with interparticle spacings averaging ~1-3 µm. Energy dispersive x-ray spectrometry (EDS) analysis of numerous particles indicated primarily Al—Si—O, often with high oxygen concentrations.

These particles are not the usual strengthening particulate compositions in tempered AA6061 alloy, and do not appear to have a significant role in strengthening the as-fabricated LPBF product. For the as-fabricated LPBF product, the average Vickers micro-indentation hardness was HV 54 (540 MPa); and with corresponding ranges for mechanical properties of 60 to 75 MPa for yield strength, 130 to 140 MPa for ultimate tensile strength, and 11% to 15% for elongation. These as-fabricated mechanical properties correspond to annealed, wrought (or zero temper) AA6061 products where the Vickers microindentation hardness can range from HV 40 to HV 70 (400 to 700 MPa); while the corresponding yield strength, ultimate tensile strength, and elongation can range from 50 MPa-110 MPa, 110 MPa-150 MPa, and 14%-25%, respectively. This precipitate composition probably arises because of powder bed heating.

The as-fabricated, inductively-heated powder bed components were also subsequently heat treated to produce a T6 temper by solutionizing heat treatment at 520° C. for 50 min., water quenching, and aging at 210° C. for 50 min.; and cooling to room temperature (25° C.) at 3 C/min. This treatment produced a yield strength ~280 MPa, ultimate tensile strength of ~310 MPa, and an elongation of 3.5%. While the yield and ultimate tensile strength values were at the upper end of the T6 temper, the elongation was below the normal low of around 5% for this temper. Resulting tensile properties of the LPBF fabricated AA6061 are compared with that of wrought AA6061 in Table 2. The yield strength and ultimate tensile strength of LPBF fabricated specimens were comparable to the corresponding properties of the wrought products. However, loss of ductility was noted in the LPBF fabricated specimens, which is expected to improve with further parameter optimization and process improvement.

TABLE 2

Comparison of mechanical properties of LPBF fabricated AA6061 and wrought annealed AA6061 for both annealed and T6 heat treated conditions.

| | | YS (MPa) | UTS (MPa) | Percent Elongation at Breakpoint |
|---|---|---|---|---|
| Heated Powder Bed- LPBF Fabricated AA6061 | Specimen 1 | 66 | 133 | 11 |
| | Specimen 2 | 75 | 141 | 15 |
| Heated Powder Bed- LPBF Fabricated AA6061 after T6 Treatment | Specimen 1 | 282 | 308 | 3.5 |
| | Specimen 2 | 290 | 318 | 5.4 |
| Wrought AA6061-O | | 55 | 124 | 30 |
| Wrought T6 treated AA-6061 | | 276 | 310 | 12 |

Average Vickers microhardness of the AA6061 specimens fabricated without powder bed heating was measured to be 90 HV with a standard deviation of 6 HV. For the specimens fabricated with powder bed heating, the average and standard deviation of Vickers hardness were 54 HV and 2.5 HV, respectively. Microhardness values for the without powder-bed heating specimens were within the range of 70-107 HV which is typical for T6 treated AA6061; whereas, microhardness for the with powder-bed heating specimens was within the range 52-70 HV for AA6061 produced by friction-stir welding. Average microhardness for the tensile specimen fabricated with powder bed heating, and subsequently T6 heat treated, was measured to be 119 HV with a standard deviation of 6 HV. A summary of Microhardness values for the three different conditions is presented in Table 3.

TABLE 3

Microhardness values of LPBF fabricated AA6061 components under different conditions

| Condition | Microhardness |
|---|---|
| As built without powder bed heating | 90 ± 6 HV |
| As built with powder bed heating at 500° C. | 54 ± 2.5 HV |
| T6 Heat treated sample after fabrication with powder bed heating at 500° C. | 119 ± 6 HV |

Figure 10:
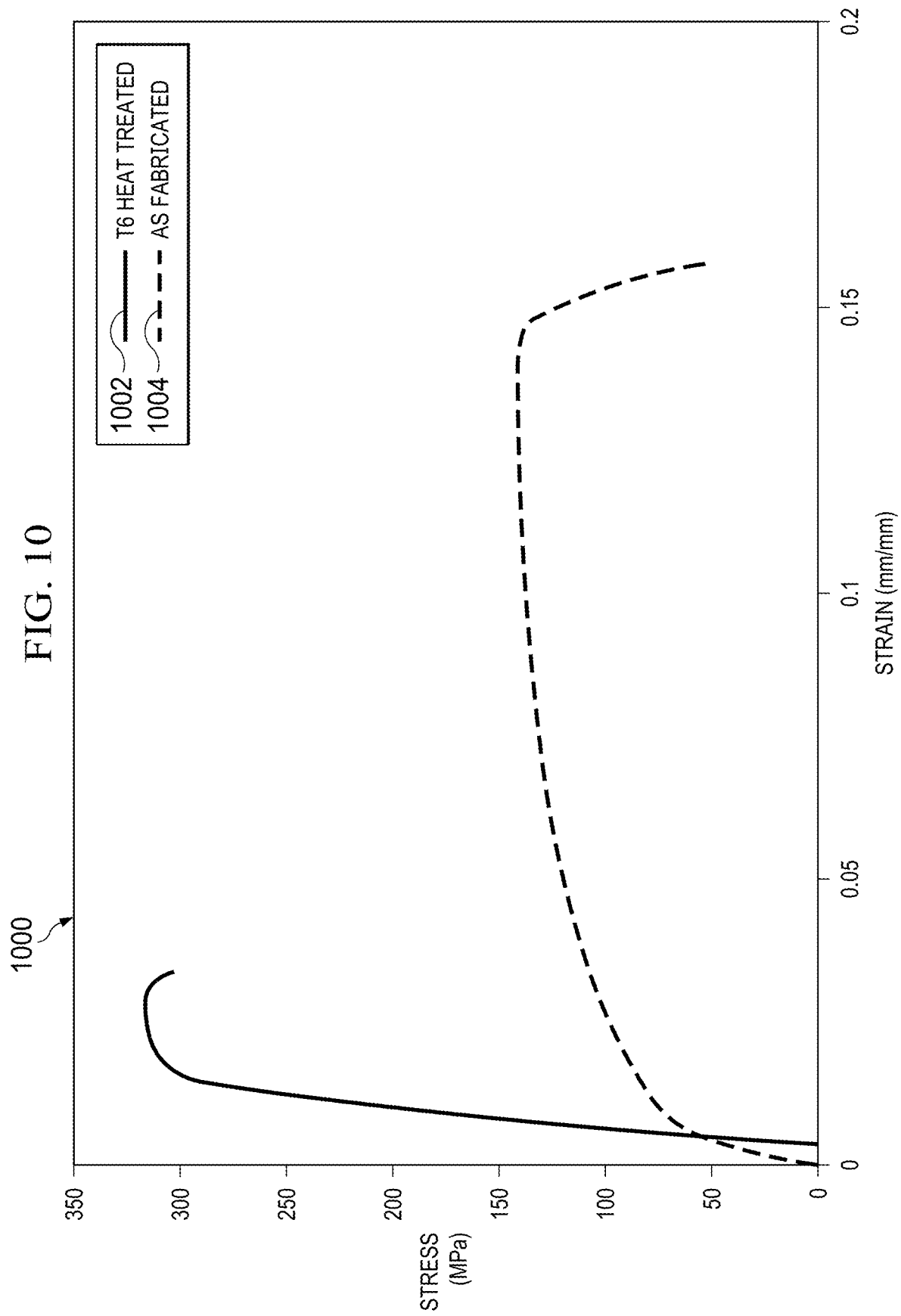
FIG. 10 is an illustration of a representative stress-strain diagram of LPBF fabricated AA6061 specimens as fabricated and T6 heat treated in accordance with an illustrative embodiment.

Turning now to FIG. 10, an illustration of a representative stress-strain diagram of LPBF fabricated AA6061 specimens as fabricated and T6 heat treated is depicted in accordance with an illustrative embodiment. Representative stress-strain diagram 1000 includes data for one tensile specimen of each type (i.e. both fabricated using 500° C. powder bed heating—one as fabricated 1002 and one with an approximate T6 post heat treatment 1004. The yield strength and ultimate tensile strength of LPBF fabricated specimens were comparable to the corresponding properties of the wrought products. However, loss of ductility was noted in the LPBF fabricated specimens.

Figure 11:
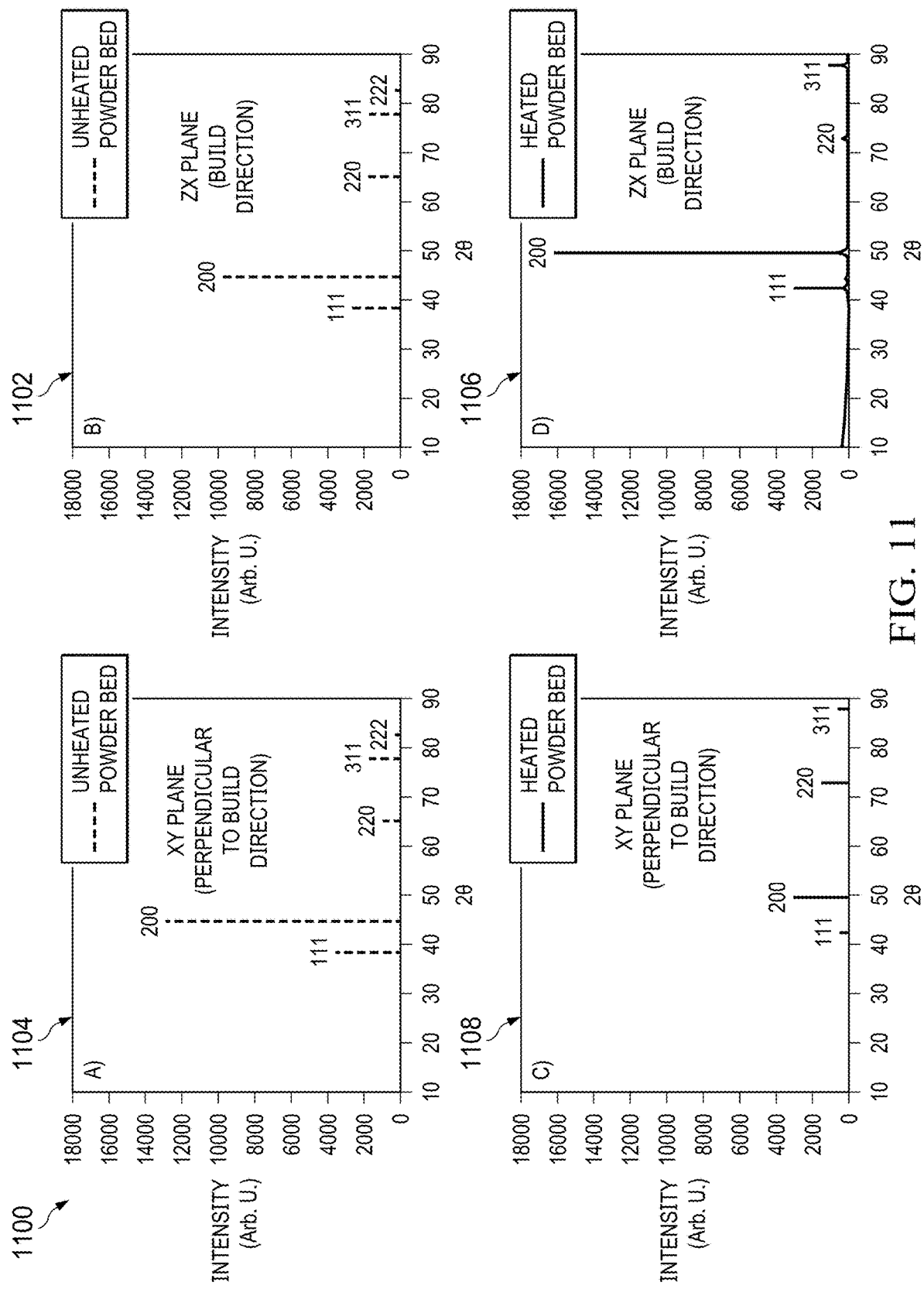
FIG. 11 is an illustration of XRD spectra for AA6061 fabricated with and without heating of the powder bed in accordance with an illustrative embodiment.

Turning now to FIG. 11, an illustration of XRD spectra for AA6061 fabricated with and without heating of the powder bed is depicted in accordance with an illustrative embodiment. The XRD spectrum 1100 reveals a preferred grain texturization in (200) orientation in both the builds, with and without induction heating of the powder bed. The (200) direction was also dominant regardless of the build direction (vertical section) or the perpendicular to build direction (horizontal section).

Although (200) was the preferred texture for crystallographic orientation, a difference was observed in its texturing intensity between the builds with heated and unheated powder bed. In the unheated powder bed, the intensity of the peaks was similar in direction and intensity in the build direction, graph 1102, and the perpendicular to build direction, graph 1104, except for a slight suppression of the (220) plane in the build direction. Meanwhile a notable difference in texturing was observed between the horizontal and vertical section of the specimens built with powder bed heating. With the heated powder bed, the vertical section, image 1106, was strongly textured with (200) planes whereas those planes were somewhat suppressed in the horizontal section, image 1108. Such a texturing is attributed to the columnar grain growth in the build direction as shown in FIG. 7, and characteristic of many other laser and electron beam fabricated metals and alloys.

Figure 12:
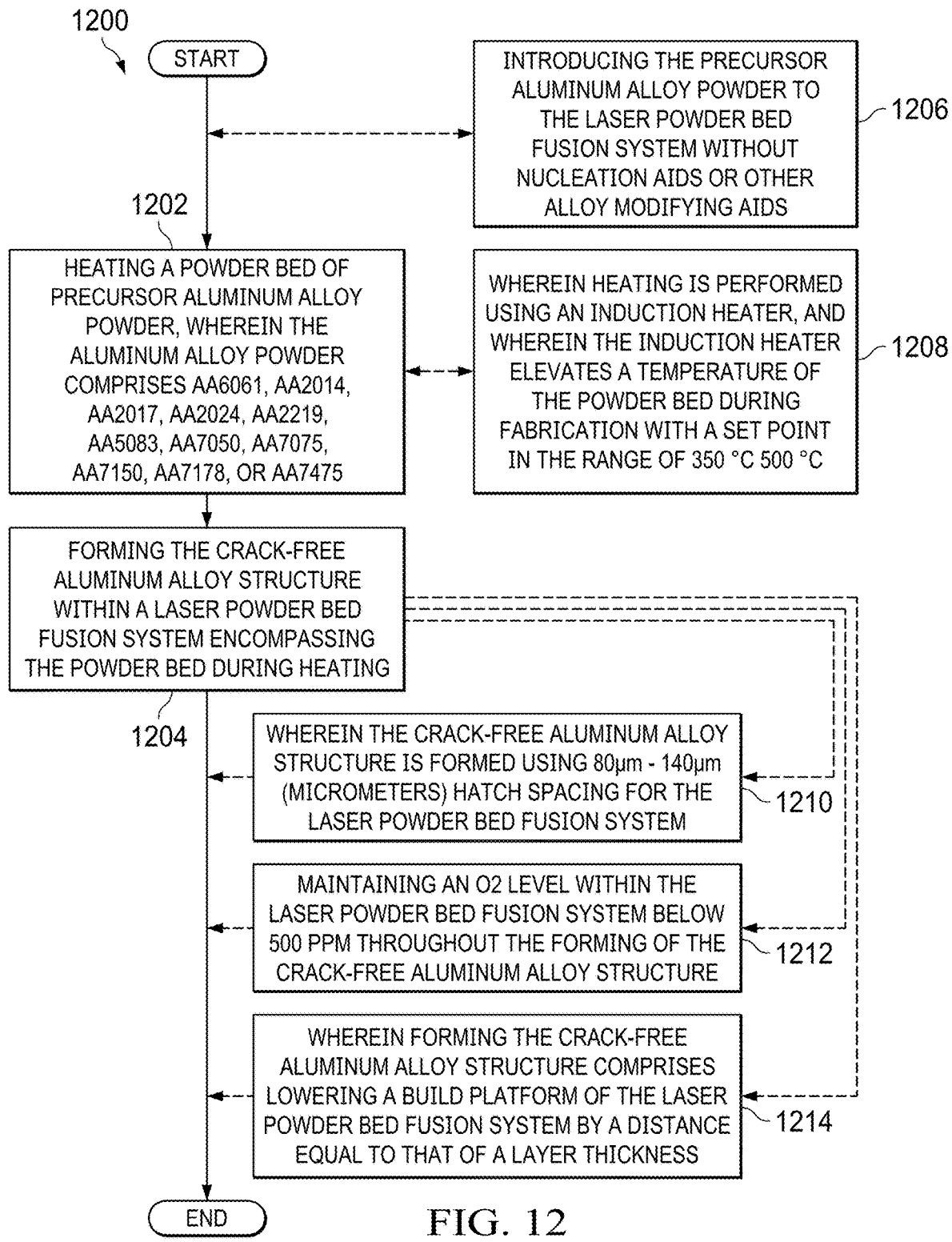
FIG. 12 is an illustration of a flowchart of a method for producing crack-free AA6061 components in accordance with an illustrative embodiment.

Turning now to FIG. 12, an illustration of a flowchart of a method for producing crack-free AA6061 components is depicted in accordance with an illustrative embodiment. Method 1200 may be a method of forming a crack-free AA6061 structure using laser powder bed fusion system 140 of FIG. 1.

Method 1200 forms a crack-free aluminum alloy structure using additive manufacturing. Method 1200 heats a powder bed of precursor aluminum alloy powder to a temperature in a range of 350° C. to 500° C., wherein the aluminum alloy powder comprises AA6061, AA2014, AA2017, AA2024, AA2219, AA5083, AA7050, AA7075, AA7150, AA7178, or AA7475 (operation 1202). Method 1200 forms the crack-free aluminum alloy structure within a laser powder bed fusion system encompassing the powder bed during heating (operation 1204). Afterwards, in some illustrative examples, method 1200 terminates.

In some illustrative examples, method 1200 introduces the precursor aluminum alloy powder to the laser powder bed fusion system without nucleation aids or other alloy modifying aids (operation 1206). In some illustrative examples, heating is performed using an induction heater (operation 1208).

In some illustrative examples, the crack-free aluminum alloy structure is formed using 80-140 µm hatch spacing for the laser powder bed fusion system (operation 1210). In some illustrative examples, the crack-free aluminum alloy structure is formed using parameters of 350° C.-500° C. heating, 70-100 µm layer thickness and 80-140 µm hatch spacing for the laser powder bed fusion system. In some illustrative examples, the crack-free aluminum alloy structure is formed using parameters of 350° C.–500° C. heating, 400 W laser power, 1400 mm/s scanning speed, 70-100 µm layer thickness and 80-140 µm hatch spacing for the laser powder bed fusion system.

In some illustrative examples, method 1200 maintains an $O_2$ level within the laser powder bed fusion system below 500 ppm throughout the forming of the crack-free aluminum alloy structure (operation 1212). In some illustrative examples, method 1200 maintains an $O_2$ level within the laser powder bed fusion system below 200 ppm throughout the forming of the crack-free aluminum alloy structure.

In some illustrative examples, forming the crack-free aluminum alloy structure comprises lowering a build platform of the laser powder bed fusion system by a distance equal to that of a layer thickness (operation 1214). In some illustrative examples, the layer thickness is in the range of 70-100 µm.

In some illustrative examples, forming the crack-free aluminum alloy structure comprises raising the powder bed by a height multiple of the layer thickness depending upon a supply factor. In some illustrative examples, the supply factor is 3. In some illustrative examples, forming the crack-free aluminum alloy structure comprises spreading the aluminum alloy powder by a back and forth movement of a rake within the laser powder bed fusion system.

In some illustrative examples, method 1200 monitors a surface temperature of the powder bed using a non-contact temperature sensor. In some illustrative examples, the non-contact temperature sensor takes the form of at least one of an optical pyrometer or a thermal camera.

In some illustrative examples of method 1200, the crack-free aluminum alloy structure does not have melt-pool and melt-tracks that are conventionally characteristic of laser powder bed fusion system processing. In some illustrative examples of method 1200, the crack-free aluminum alloy structure comprises elongated grains observed in a build direction of the laser powder bed fusion system having average lengths of approximately 0.4 mm and widths of approximately 40 µm.

In some illustrative examples of method 1200, the crack-free aluminum alloy structure comprises elongated grains observed in a build direction of the laser powder bed fusion system having an approximately 10/1 ratio of length to width. In some illustrative examples of method 1200, the crack-free aluminum alloy structure comprises precipitates within the grain boundaries of the crack-free aluminum alloy structure.

In some illustrative examples of method 1200, the precipitates appear to have sizes ranging from approximately 200 nm to 5 µm, with interparticle spacings averaging approximately 1-3 µm. In some illustrative examples of method 1200, the precipitates comprise primarily Al—Si—O.

In some illustrative examples of method 1200, the crack-free aluminum alloy structure is a high complexity part having at least one of a thin feature or a conformal channel. In some illustrative examples of method 1200, the method of claim 1, wherein the crack-free aluminum alloy structure is nearly fully dense.

Figure 13:
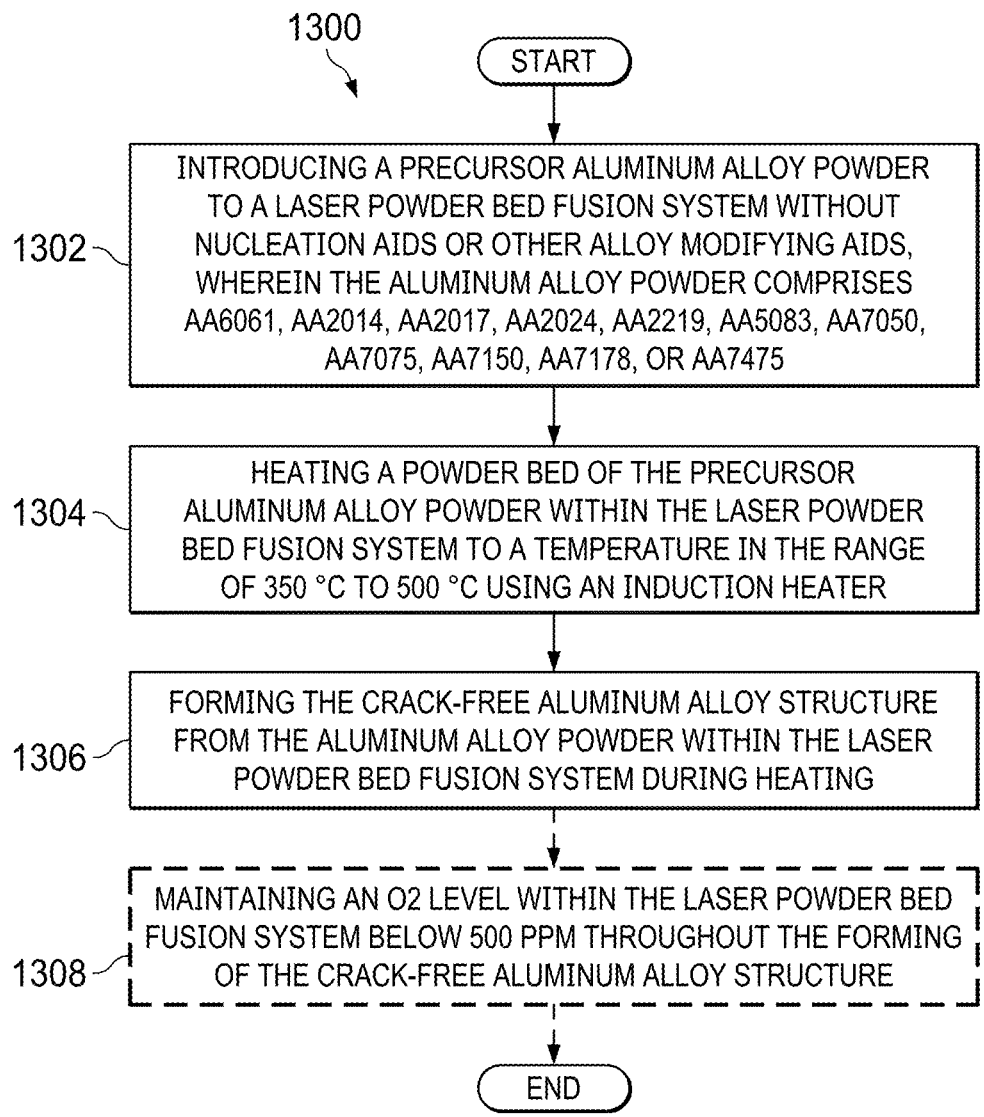
FIG. 13 is an illustration of a flowchart of a method for producing crack-free AA6061 components in accordance with an illustrative embodiment.

Turning now to FIG. 13, an illustration of a flowchart of a method for producing crack-free AA6061 components is depicted in accordance with an illustrative embodiment. Method 1300 may be a method of forming a crack-free AA6061 structure using laser powder bed fusion system 140 of FIG. 1.

Method 1300 forms a crack-free aluminum alloy structure using additive manufacturing. Method 1300 introduces a precursor aluminum alloy powder to a laser powder bed fusion system without nucleation aids or other alloy modifying aids (operation 1302).

Method 1300 heats a powder bed of the precursor aluminum alloy powder within the laser powder bed fusion system to a temperature in the range of 350° C. to 500° C. using an induction heater (operation 1304). Method 1300 forms the crack-free aluminum alloy structure from the aluminum alloy powder within the laser powder bed fusion system during heating (operation 1306). Afterwards, method 1300 terminates.

In some illustrative examples, method 1300 optionally maintains an $O_2$ level within the laser powder bed fusion system below 500 ppm throughout the forming of the crack-free aluminum alloy structure (operation 1308).

Still other variations are possible. More or fewer operations may be present, or different operations may be present. The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

In some illustrative examples, some of the operations are optional. For example, any of operations 1206 through 1218 of FIG. 12 may be optional.

Figure 14:
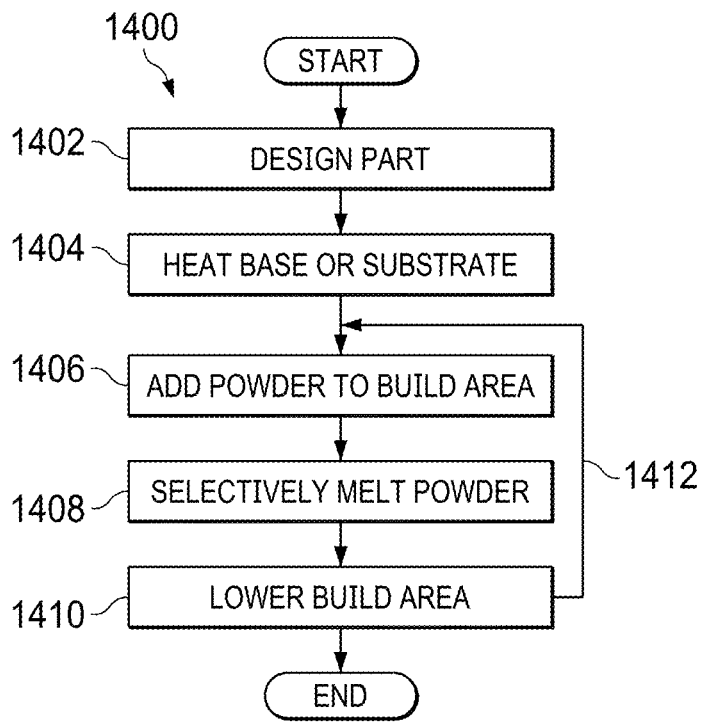
FIG. 14 is an illustration of a flowchart of a manufacturing process using a LPBF system in accordance with an illustrative embodiment.

In a basic manufacturing method 1400 for using the system illustrated in FIG. 14, a part can be designed (operation 1402). The metal plate can be used as the base or substrate for the fabrication process, and can be heated to the desired temperature with the heating element (operation 1404). Next, a layer of powder is deposited in the build area (operation 1406) and selectively melted with the laser source (operation 1408). The build area is lowered (operation 1410) one layer thickness, and the process is repeated (operation 1412) until fabrication of the desired shape or part is complete.

Figure 15:
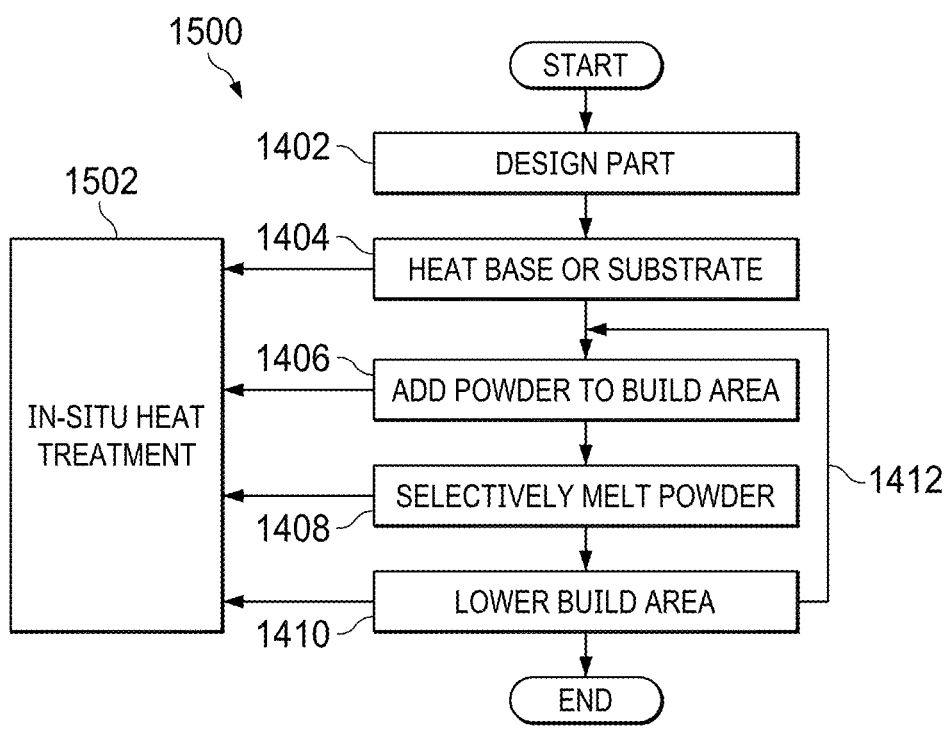
FIG. 15 is an illustration of a flowchart of a manufacturing process having an in-situ heat treatment using a LPBF system in accordance with an illustrative embodiment.

In certain embodiments of the fabrication method, in situ heat treatments can be enacted during the fabrication process, prior to removing the part from the system. Such a method, method 1500, is illustrated in FIG. 15. The energy source or sources, the heating element, or some combination thereof can be used to heat treat (operation 1502) the part to age and/or harden the part prior to removal from the machine.

Figure 16:
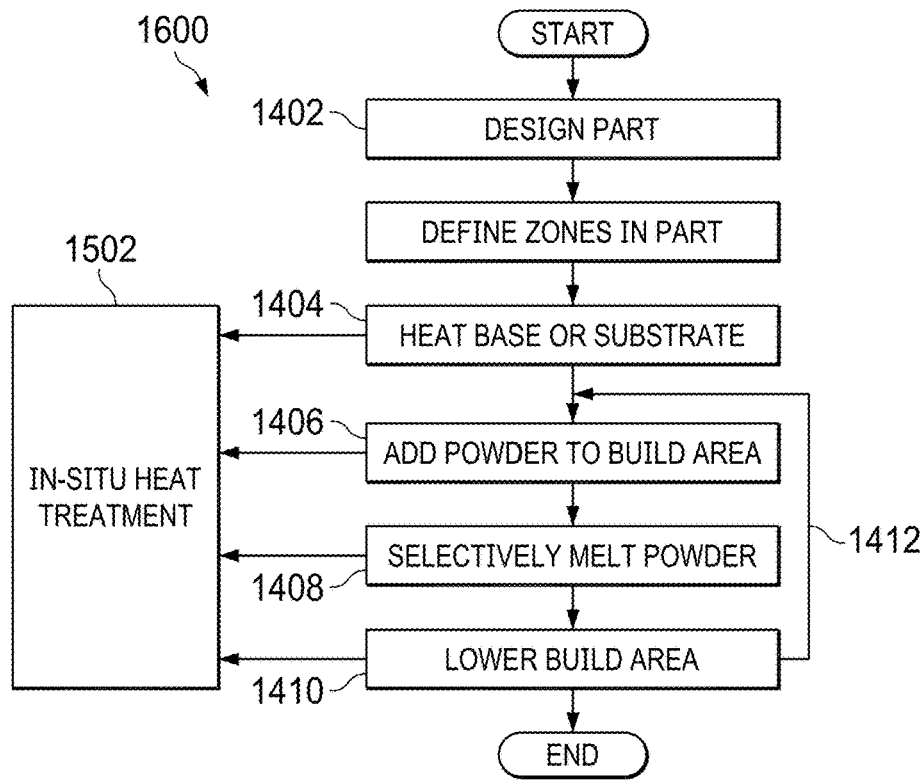
FIG. 16 is an illustration of a flowchart of a manufacturing process with zones in a part using a LPBF system in accordance with an illustrative embodiment.

In certain embodiments of method 1600 shown in FIG. 16, zones of the individual layers can be defined (operation 1602) and subjected to a treatment cycle (operation 1502) to create a graded microstructure. Furthermore, utilizing both the heating element and energy source(s) will facilitate the solidification of the part. As a consequence, the precipitates in the part can be controlled inside the specified zones.

In other embodiments, the entire part can be treated to age the part, prior to removal from the system. In certain embodiments, the heating element is set to a designated temperature and held for a specified amount of time to ensure an ageing or annealing process, in situ.

Solidification control of the part can be achieved according to the methods and systems disclosed herein. In order to achieve crack-free material fabrication, three variables are controlled: thermal mass, temperature change from melting (liquidus temperature) to build temperature (powder temperature), and scan strategy. Changing these parameters will control solidification rates of the fabricated material. Thermal mass is indirectly related to the solidification rate; thus, a larger mass will solidify at a slower rate because of the increased heat capacity. Secondly, increasing the powder temperature can reduce the heat loss through conduction, minimize shrinkage, and limit the effects latent heat of fusion. Materials with high latent heats of fusion, high thermal conductivity, and high CTE (thermal expansion) will solidify and contract very rapidly causing hot cracking or hot tearing. Table 4 provides a chart illustrating the quantification of parameter solidification rates.

As depicted, layer thickness and hatch spacing in Table 4 are measured in micrometers. $T_p$ is a measurement of the temperature of the platform. $T_p$ may also be referred to as $T_{platform}$. $T_{platform}$ is measured in degrees Celsius (° C.). $T_{liquidus}$ for AA6061 is 652 degrees Celsius. $\Delta T = T_{liquidus} - T_{platform}$.

In an embodiment a metric can be used to quantify the interaction between these parameters and control the material phase changes. Based on the specific heat formula $q=mc\Delta t$, a ratio between mass (m) and temperature difference ($\Delta t$) can be used to quantify solidification behavior. Thermal mass is calculated by using the input parameters, layer thickness and the square of the hatch spacing to calculate the volume, and is multiplied by density. The higher the ratio, $n=m/\Delta t$, the less likely cracking is to occur. Thermal mass (m) is calculated by finding the melt pool volume, V=layer thickness*hatch spacing$^2$ then multiplying by the material density ($\rho$). For Al 6061 values greater than 1.79e-08 g/° C. resulted in a crack-free fabricated material.

Materials also must be considered. Alloys that are hard to fabricate via powder bed fusion, can be identified by calculating a ratio of latent heat of fusion (H) to melting temperature (TM). Alloys with a larger ratio (H/TM) such as, aluminum, beryllium, magnesium, and silicon metal and alloys will be more difficult to fabricate conventionally with powder bed fusion; fabrication can be improved by increasing melt pool thermal mass to prevent cracking during melting and solidifying.

Thermal conductivity also plays an important role in assessing whether the material will be easy to fabricate. High thermal conductivity will contribute to cracking by increasing the cooling rate, and therefore the solidification rate. Moreover, a high thermal conductivity will reduce thermal stress and allow layer thickness parameters to be increased. Increasing layer thickness will increase thermal mass and reduce solidification rate, allowing a high ratio (H/TM) and high thermal conductivity material to be fabricated crack-free. The opposite is true for materials with lower thermal conductivity. As such, a faster scan of thinner layers is required to reduce thermal stress. In certain embodiments, the control system can be used to realize these requirements during the fabrication process given the thermal conductivity of the material being used.

In certain embodiments, preheating can be employed to help address these challenges. Preheating raises the powder temperature prior to melting. The preheating provides the higher energy needed, to properly melt the powder and fabricate a dense and robust part. Additionally, preheating is beneficial during fabrication to reduce the solidification rate during melting. Creating an elevated surrounding temperature for the powder bed reduces the heat conduction and, in turn, cooling/solidification rate. Furthermore, the elevated temperature will reduce shrinkage during solidification, reducing thermal stress during the fabrication process.

TABLE 4

Quantification of parameter solidification rates.

| Experiment | Layer Thickness (μm) | Hatch Spacing (μm) | m | $T_p$ | $\Delta T$ | n = m/$\Delta T$ | comment |
| --- | --- | --- | --- | --- | --- | --- | --- |
| 12 | 100 | 140 | 5.29E−06 | 500 | 152 | 3.48E−08 | No Cracks |
| 9 | 70 | 120 | 2.72E−06 | 500 | 152 | 1.79E−08 | Cracks |
| 9 | 70 | 140 | 3.70E−06 | 500 | 152 | 2.44E−08 | No Cracks |
| 3 | 30 | 140 | 1.59E−06 | 350 | 302 | 5.26E−09 | Cracks |
| 3 | 30 | 120 | 1.17E−06 | 350 | 30 | 3.86E−09 | Cracks |
| 3 | 30 | 100 | 8.10E−07 | 350 | 302 | 2.68E−09 | Cracks |
| 3 | 30 | 80 | 5.18E−07 | 350 | 302 | 1.72E−09 | Cracks |
| 8 | 30 | 140 | 1.59E−06 | 400 | 252 | 6.30E−09 | Cracks |
| 8 | 30 | 120 | 1.17E−06 | 400 | 252 | 4.63E−09 | Cracks |
| 8 | 30 | 100 | 8.10E−07 | 400 | 252 | 3.21E−09 | Cracks |
| 8 | 30 | 80 | 5.18E−07 | 400 | 252 | 2.06E−09 | Cracks |

Figure 17:
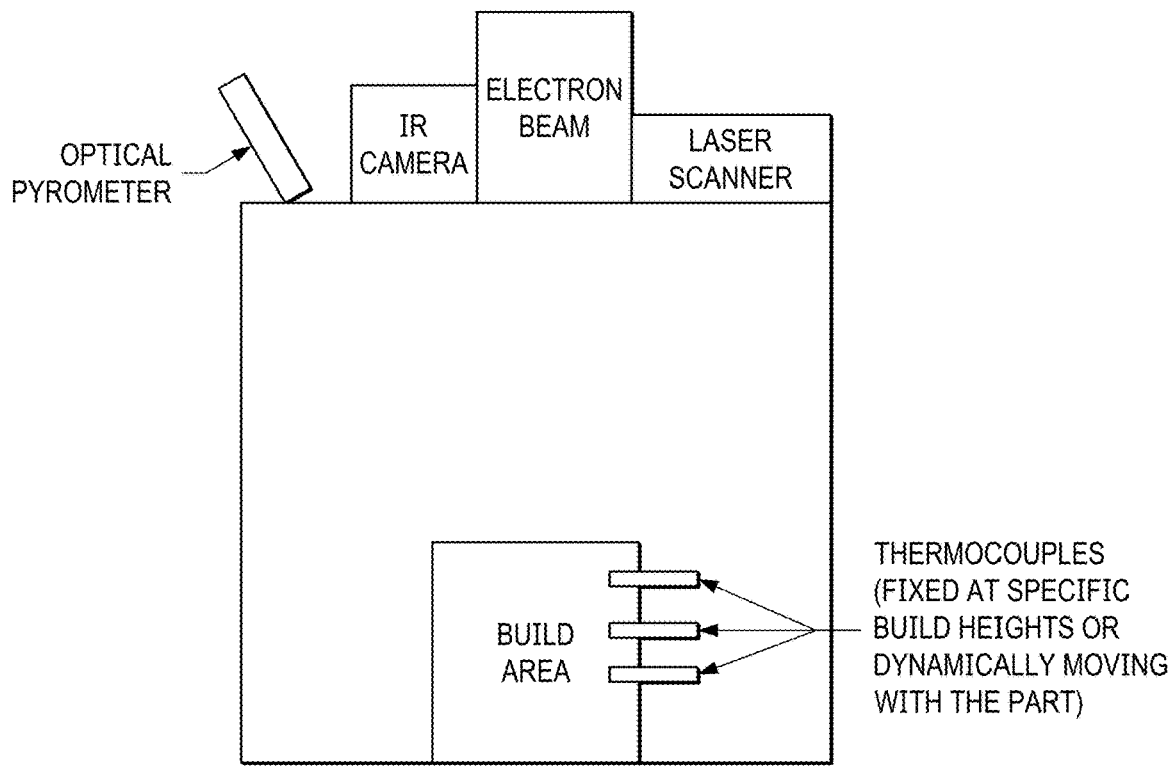
FIG. 17 is an illustration of a cross-sectional view of a system with multiple energy sources, heating elements, and temperature monitoring in accordance with an illustrative embodiment.

Turning now to FIG. 17, an illustration of a cross-sectional view of a system with multiple energy sources, heating elements, and temperature monitoring is depicted in accordance with an illustrative embodiment. For certain fabrication, multiple energy sources, heating elements and thermal measurement devices are required to achieve crack-free parts and/or parts designed microstructure. During fabrication the build is lower, changing the thermal gradient during fabrication and influencing the thermal history and therefore, the end material microstructure. Utilization of multiple temperature feedback devices, pyrometers, IR cameras and thermal couple can be used to monitor and tune the process to achieve the desired microstructural outcome, i.e. crack-free. Additionally, utilizing multiple energy sources, to control temperatures of specific regions or as heating elements will be required to compensate the changing thermal gradient during fabrication. Thermal couples can move dynamically to monitor locations on the build platform, or fixed in the build to monitor specific fabrication heights.

An optical pyrometer gives the temperature of the surface of the part created on the build platform. As a part is built up on the build platform, the surface of the part becomes farther and farther from the build platform. When the build platform is inductively heated, a temperature reading from the build platform may not accurately represent the temperature of the surface of the part. The surface of the part is the target for the laser, and it is desirable to maintain a desired processing temperature at the surface. With only a temperature reading of the build platform, a separate method of determining if the desired temperature is being maintained at that the build location (the part surface) is desirable.

Temperature data from an external instrument, an optical pyrometer or infrared camera or other non-contact temperature sensor would provide the temperature of the surface of the part. Using the non-contact temperature sensor such as an optical pyrometer or an infrared camera, the surface of the part can be maintained at a desirable temperature (such as about 500° C.) to create crack-free parts.

Accordingly, the above systems and methods can be used in an embodiment, to fabricate a crack-free part. The parameters necessary to achieve a crack-free material in accordance with the embodiments disclosed herein are outlined below and defined in terms of laser melting additive manufacturing system parameters.

In one embodiment of the methods and systems disclosed herein, the energy source (e.g. laser) can be defined/controlled by a scan speed, or linear measurement of beam displacement over time, and emission power. The manufacturing system can process one layer at a time. Layer thickness can be defined by the parameters. The system can also provide heating to control the powder bed temperature. The inductive, microwave, and/or resistive heating source can then be applied to heat the powder bed. Note that the maximum powder bed temperature should always be below the solidus temperature of the material being processed.

Static parameter ranges to achieve crack-free material:
Source scan speed laser #1 beam diameter 1-1000 microns: 0-7000 mm/s
Source scan speed laser #2 beam diameter 1-1000 microns: 0-7000 mm/s
Emitted power: 1-3.5 kW
Layer thickness: 0-500 um
Powder temperature: 0-2000° C.

In another embodiment fabrication of crack-free graded microstructures can also be achieved according to the methods and systems disclosed herein. Creation of crack-free graded microstructures is achieved by using different process parameters to fabricate a single part. The part is divided into zones, different process parameters can be used to fabricate each zone, achieving differing microstructures. The processing window is defined below as ranges of process parameters. Hatch spacing is defined as the distance between source scan vectors. Energy scan speed is the linear displacement velocity of the source, and source power is defined as emitted power. A temperature gradient measured from the start plate to the powder layer is controlled by modifying the respective temperatures through heating (induction, resistive, or microwave), or cooling (convection of inert gas flow, or powder bed cooling).

Parameter ranges to create graded microstructures:
Hatch spacing: 0-2 mm
Source scan speed laser #1 beam diameter 1-1000 microns: 0-7000 mm/s
Source scan speed laser #2 beam diameter 1-1000 microns: 0-7000 mm/s
Source power: 1-3.5 kW
Powder temperature: 0-2000° C.

In another embodiment, crack-free gradient microstructures can be formed according to the methods and systems disclosed herein.

Figure 18:
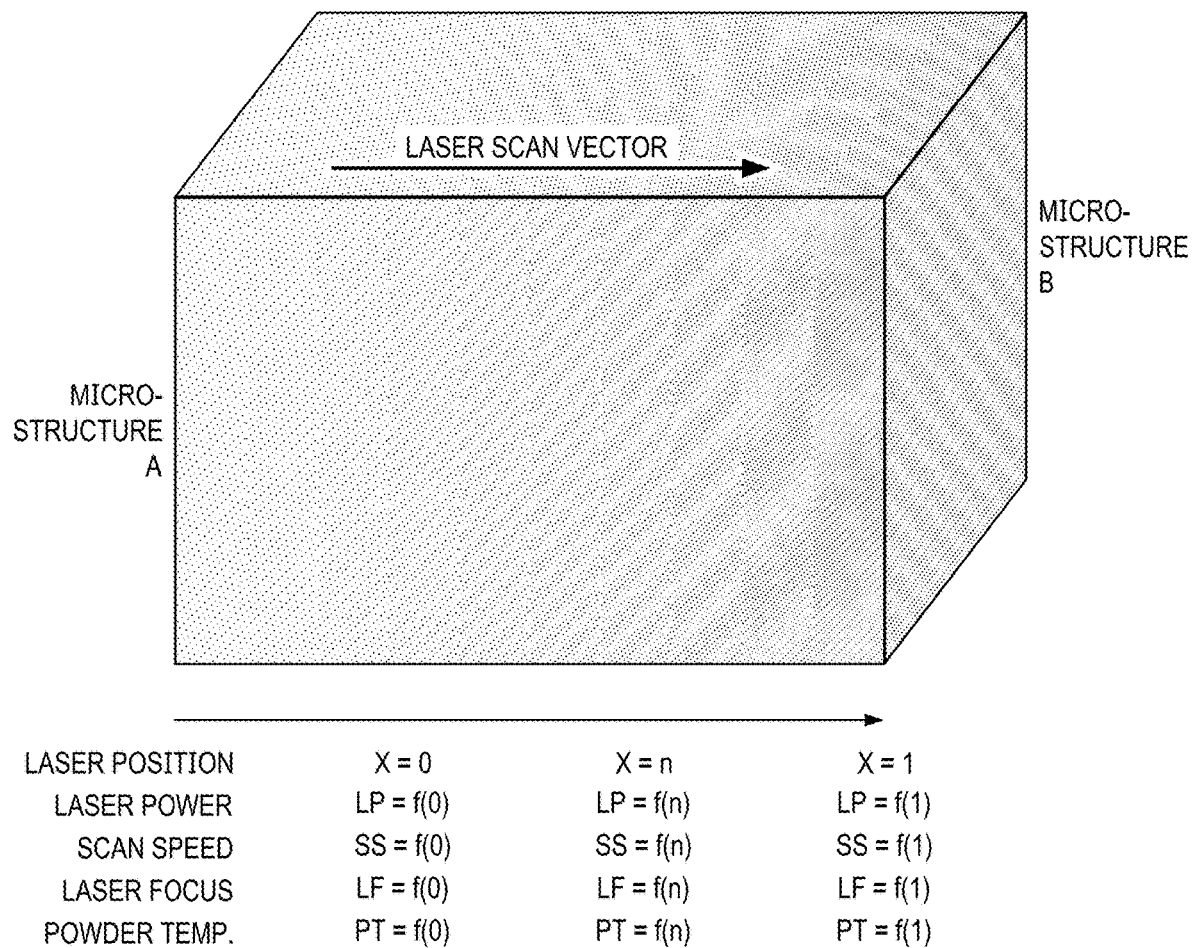
FIG. 18 is an illustration of a graded microstructure and the various values of laser position, laser power, scan speed, laser focus, and powder temperature, given as a function of source position in accordance with an illustrative embodiment.

Gradient structures are created by dynamically changing source parameters within a scan vector and are defined by a mathematical function. FIG. 18 illustrates an exemplary illustration of a graded microstructure and the various values of laser position, laser power, scan speed, laser focus, and powder temperature, given as a function of source position. Measured from the starting point to end point of the vector scan, the source scan speed, source power, source focus, and powder layer temperature will change as a function of source position. Source scan speed is the linear displacement velocity measured between two points, and source power is the emitted power of the source. Source focus is altered by changing the height of the laser scanner measured by an offset (positive and negative) from the focal position. The powder temperature is the temperature of the powder prior to melting with the energy source.

Dynamic parameters ranges to create gradient microstructures:
Source scan speed laser #1 beam diameter 1-1000 microns: 0-7000 mm/s
Source scan speed laser #2 beam diameter 1-1000 microns: 0-7000 mm/s
Source power: 1-3.5 kW
Source focus: (−10)-10 mm
Powder temperature: 0-2000° C.

In another embodiment, fabrication of crack-free material is created using an electron beam energy source and is defined/controlled by scan speed, beam current, focus offset current, layer thickness and build temperature. This can be used in conjunction with additional heating and energy sources, laser beams, inductive heating, microwave heating, or resistive heating. These parameters can be kept constant, varied spatially, or dynamically to achieve the desired microstructure.

Scan speed: 0-14600 mm/s
Beam current: 0-100 mA
Focus offset: 0-50 mA
Layer thickness: 30-500 um
Build temperature: 0-2000° C.

Figure 19:
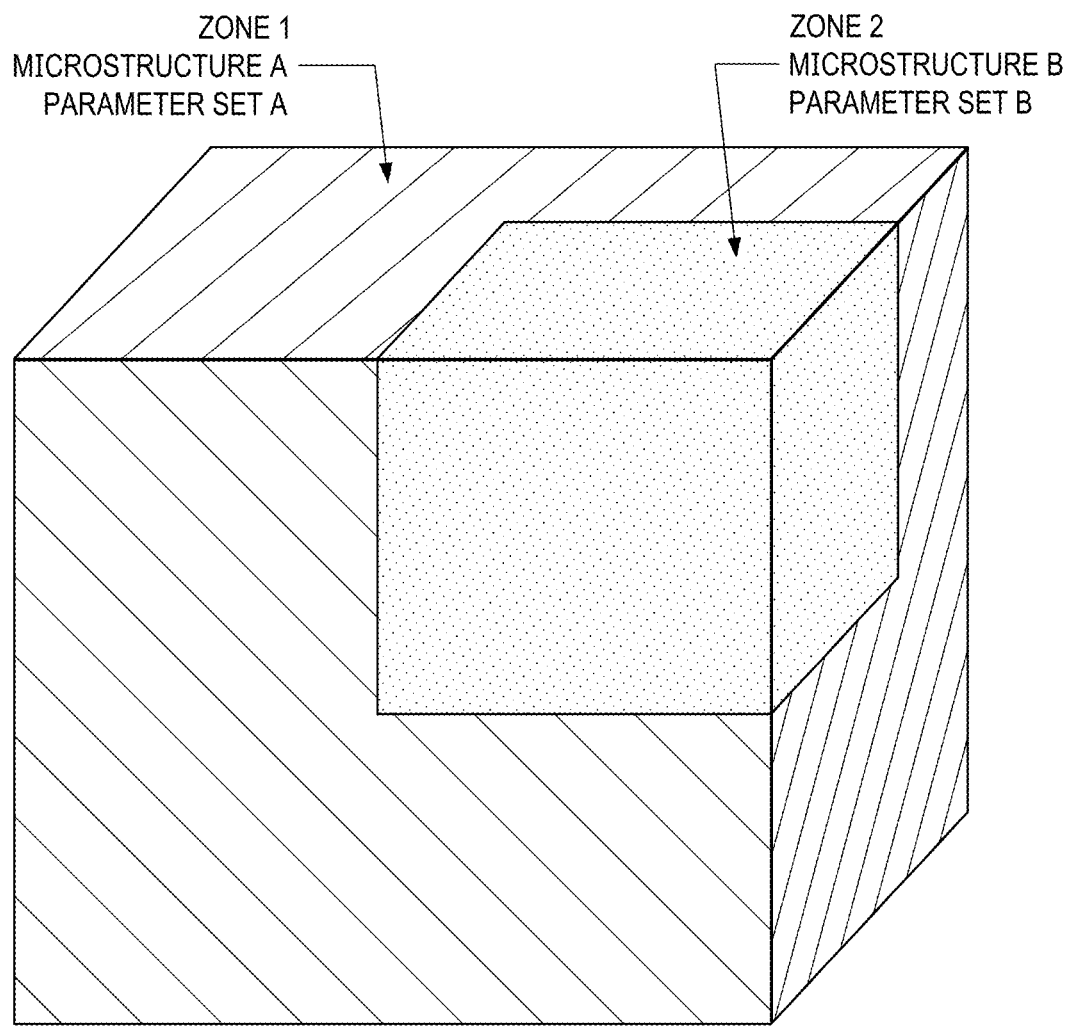
FIG. 19 is an exemplary schematic of a graded material comprising two different microstructure "zones," that could be manufactured according to the method in FIG. 16 in accordance with an illustrative embodiment.

FIG. 19 illustrates, an exemplary schematic of a graded material comprising two different microstructure "zones," That could be manufactured according to the method in FIG. 16. It should be appreciated that, in other embodiments, multiple zones, with any number of shapes and sizes could be fabricated according to the methods disclosed herein.

Figure 20:
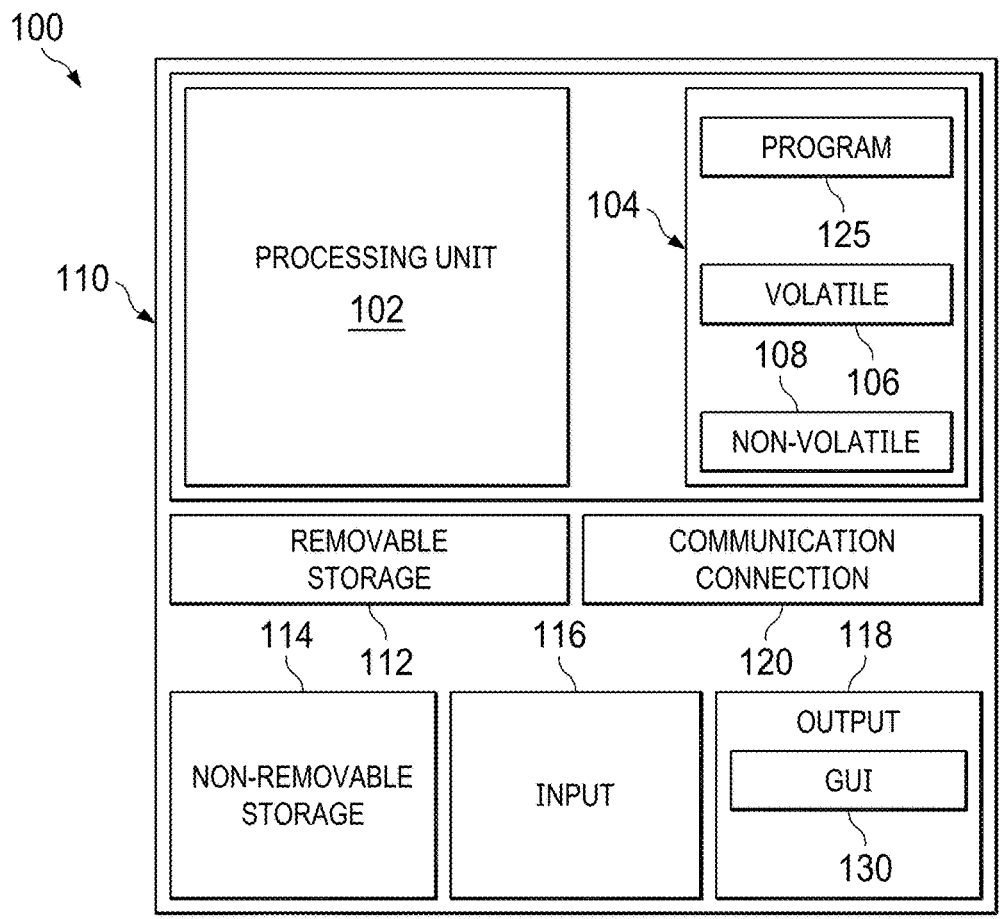
FIG. 20 is an illustration of a block diagram of a computer system that executes programming for implementing the methods and systems disclosed herein in accordance with an illustrative embodiment.
Figure 21:
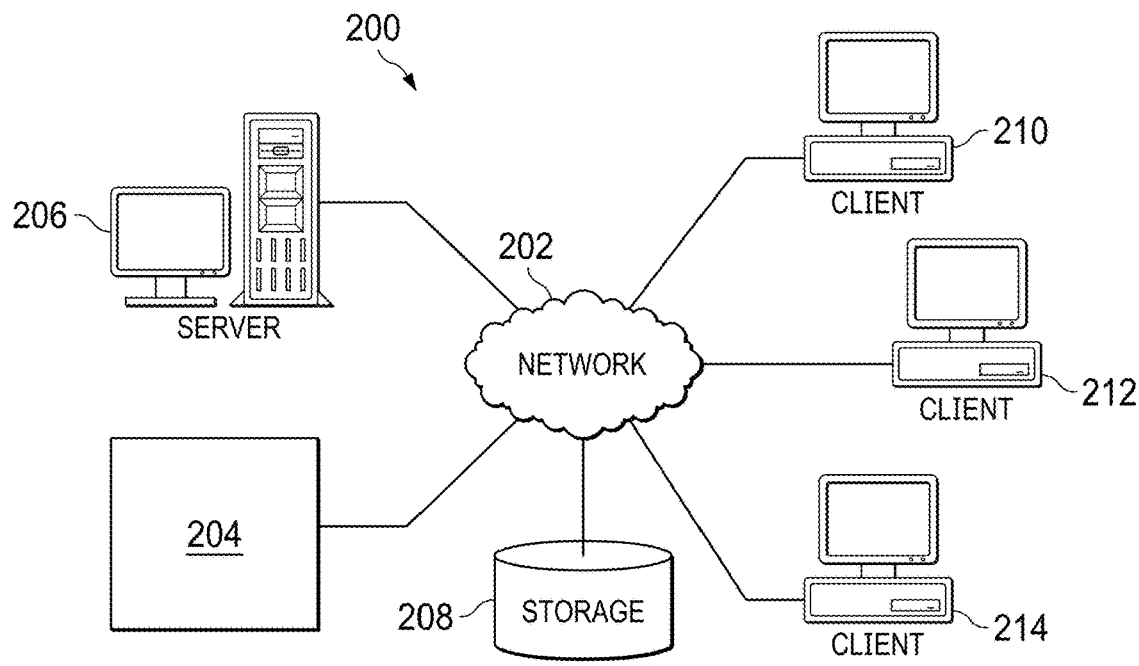
FIG. 21 is an illustration of a network of data-processing systems in accordance with an illustrative embodiment.
Figure 22:
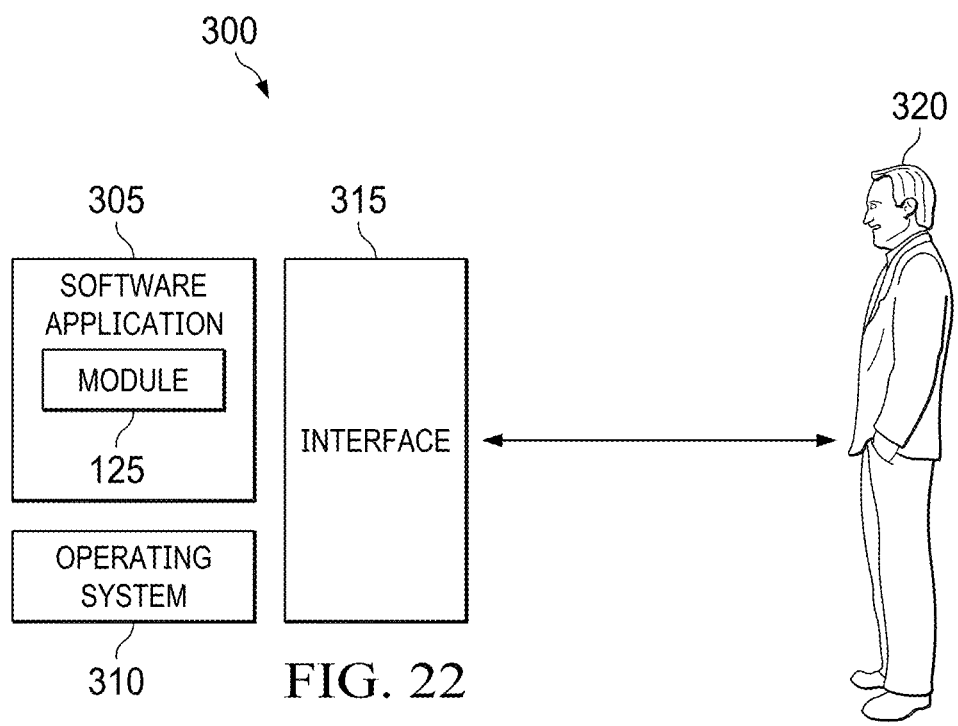
FIG. 22 is an illustration of a computer software system, which may be employed for directing the operation of the data-processing systems such as a computer system in accordance with an illustrative embodiment.

FIGS. 20-22 are provided as exemplary diagrams of data-processing environments in which embodiments of the present invention may be implemented. It should be appreciated that FIGS. 20-22 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

A block diagram of a computer system 100 that executes programming for implementing the methods and systems disclosed herein is shown in FIG. 20. A general computing device in the form of a computer 110 may include a processing unit 102, memory 104, removable storage 112, and non-removable storage 114. Memory 104 may include volatile memory 106 and non-volatile memory 108. Computer 110 may include or have access to a computing environment that includes a variety of transitory and non-transitory computer-readable media such as volatile memory 106 and non-volatile memory 108, removable storage 112 and non-removable storage 114. Computer storage includes, for example, random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage, or other magnetic storage devices, or any other medium capable of storing computer-readable instructions as well as data, including data comprising frames of video.

Computer 110 may include or have access to a computing environment that includes input 116, output 118, and a communication connection 120. The computer may operate in a networked environment using a communication connection to connect to one or more remote computers or devices. The remote computer may include a personal computer (PC), server, router, network PC, a peer device or other common network node, or the like. The remote device may include a sensor, photographic camera, video camera, tracking device, or the like. The communication connection may include a Local Area Network (LAN), a Wide Area Network (WAN), or other networks. This functionality is described in more fully in the description associated with FIG. 21 below.

Output 118 is most commonly provided as a computer monitor, but may include any computer output device. Output 118 may also include a data collection apparatus associated with computer system 100. In addition, input 116, which commonly includes a computer keyboard and/or pointing device such as a computer mouse, computer track pad, or the like, allows a user to select and instruct computer system 100. A user interface can be provided using output 118 and input 116. Output 118 may function as a display for displaying data and information for a user and for interactively displaying a graphical user interface (GUI) 130.

Note that the term "GUI" generally refers to a type of environment that represents programs, files, options, and so forth by means of graphically displayed icons, menus, and dialog boxes on a computer monitor screen. A user can interact with the GUI to select and activate such options by directly touching the screen and/or pointing and clicking with a user input device 116 such as, for example, a pointing device such as a mouse, and/or with a keyboard. A particular item can function in the same manner to the user in all applications because the GUI provides standard software routines (e.g., module 125) to handle these elements and report the user's actions. The GUI can further be used to display the electronic service image frames as discussed below.

Computer-readable instructions, for example, program module 125, which can be representative of other modules described herein, are stored on a computer-readable medium and are executable by the processing unit 102 of computer 110. Program module 125 may include a computer application. A hard drive, CD-ROM, RAM, Flash Memory, and a USB drive are just some examples of articles including a computer-readable medium.

FIG. 21 depicts a graphical representation of a network of data-processing systems 200 in which aspects of the present invention may be implemented. Network data-processing system 200 is a network of computers in which embodiments of the present invention may be implemented. Note that the system 200 can be implemented in the context of a software module such as program module 125. The system 200 includes a network 202 in communication with one or more clients 210, 212, and 214. Network 202 is a medium that can be used to provide communications links between various devices and computers connected together within a networked data-processing system such as computer system 100. Network 202 may include connections such as wired communication links, wireless communication links, or fiber optic cables. Network 202 can further communicate with one or more of server 206, one or more external devices such as an additive manufacturing device, actuator, and/or sensor 204, and a memory storage unit such as, for example, memory or database 208.

In the depicted example, additive manufacturing device, actuator, and/or sensor 204 and server 206 connect to network 202 along with storage unit 208. In addition, clients 210, 212, and 214 connect to network 202. These clients 210, 212, and 214 may be, for example, personal computers or network computers. Computer system 100 depicted in FIG. 20 can be, for example, a client such as client 210, 212, and/or 214. Alternatively, clients 210, 212, and 214 may also be, for example, a photographic camera, a video camera, a tracking device, a sensor, a medical sensor, etc.

Computer system 100 can also be implemented as a server such as server 206, depending upon design considerations. In the depicted example, server 206 provides data such as boot files, operating system images, applications, and application updates to clients 210, 212, and 214, and/or to external device 204. Clients 210, 212, and 214 and sensor 204 are clients to server 206 in this example. Network data-processing system 200 may include additional servers, clients, and other devices not shown. Specifically, clients may connect to any member of a network of servers, which provide equivalent content.

In the depicted example, network data-processing system 200 is the Internet with network 202 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, government, educational, and other computer systems that route data and messages. Of course, network data-processing system 200 may also be implemented as a number of different types of networks such as, for example, an intranet, a local area network (LAN), or a wide area network (WAN). FIGS. 20 and 21 are intended as examples and not as architectural limitations for different embodiments of the present invention.

FIG. 22 illustrates a computer software system 300, which may be employed for directing the operation of the data-processing systems such as computer system 100 depicted in FIG. 20. Software application 305, may be stored in memory 104, on removable storage 112, or on non-removable storage 114 shown in FIG. 20, and generally includes and/or is associated with a kernel or operating system 310 and a shell or interface 315. One or more application programs, such as module(s) 125, may be "loaded" (i.e., transferred from removable storage 112 into the memory 104) for execution by the data-processing system 100. The data-processing system 100 can receive user commands and data through user interface 315, which can include input 116 and output 118, accessible by a user 320. These inputs may then be acted upon by the computer system 100 in accordance with instructions from operating system 310 and/or software application 305 and any software module(s) 125 thereof.

Generally, program modules (e.g., module 125) can include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations such as, for example, hand-held devices, multi-processor systems, data networks, microprocessor-based or programmable consumer electronics, networked personal computers, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines, and an implementation, which is typically private (accessible only to that module) and which includes source code that actually implements the routines in the module. The term module may also simply refer to an application such as a computer program designed to assist in the performance of a specific task such as word processing, accounting, inventory management, etc.

The interface 315 (e.g., a graphical user interface 130) can serve to display results, whereupon a user 320 may supply additional inputs or terminate a particular session. In some embodiments, operating system 310 and GUI 130 can be implemented in the context of a "windows" system. It can be appreciated, of course, that other types of systems are possible. For example, rather than a traditional "windows" system, other operation systems such as, for example, a real time operating system (RTOS) more commonly employed in wireless systems may also be employed with respect to operating system 310 and interface 315. The software application 305 can include, for example, module(s) 125, which can include instructions for carrying out steps or logical operations such as those shown and described herein.

The following description is presented with respect to embodiments of the present invention, which can be embodied in the context of a data-processing system such as computer system 100, in conjunction with program module 125, and data-processing system 200 and network 202 depicted in FIGS. 1-2. The present invention, however, is not limited to any particular application or any particular environment. Instead, those skilled in the art will find that the system and method of the present invention may be advantageously applied to a variety of system and application software including database management systems, word processors, and the like. Moreover, the present invention may be embodied on a variety of different platforms including Macintosh, UNIX, LINUX, CAD, and the like. Therefore, the descriptions of the exemplary embodiments, which follow, are for purposes of illustration and not considered a limitation.

In some illustrative examples, a system is presented. The system compromises a fabrication system; and a control system. The control system comprises at least one processor; and a storage device communicatively coupled to the at least one processor. The storage device stores instructions which, when executed by the at least one processor, cause the at least one processor to perform operations comprising: receiving a set of design parameters for a part; identifying characteristics of said part; and implementing a fabrication protocol utilizing heated build area for said part according to said set of design parameters and said characteristics of said part in order to create a crack free microstructure associated with said part.

In some illustrative examples, the system further comprises an energy source; a heating element; a build platform; and a feedstock powder. In some illustrative examples, the control system controls motion of said energy source, a number of scans per layer, and an emitted power.

In some illustrative examples, the control system controls the heating element. In some illustrative examples, the system further comprises an optical pyrometer; a thermocouple; and an infrared camera, wherein it is used to control powder and part temperature.

In some illustrative examples, the control system is further configured for controlling a thermal mass. In some illustrative examples, the control system minimizes shrinkage upon solidification of the feedstock powder. In some illustrative examples, the control system controls the solidification rate of the feedstock powder.

In some illustrative examples, the feedstock powder further comprises: a metal with a ratio of latent heat of fusion to melting point greater than 0.19. In some illustrative examples, the part comprises a designed, graded and/or gradient precipitate formation. In some illustrative examples, said heating source provides in situ heat treatment utilizing at least one of: the energy source and the heating element, to create said desired microstructure.

The illustrative examples provide methods and systems for performing LPBF manufacturing of crack-free aluminum alloy structures. The illustrative examples provide methods and systems for processing of aluminum alloys such as AA2014, AA2017, AA2024, AA2219, AA5083, AA6061, AA7050, AA7075, AA7150, AA7178, and AA7475 that have large differences in melting temperatures within these alloys.

The illustrative examples provide for the use of induction heating to preheat the powder bed prior to and during laser melting. The illustrative examples identify that preheating the powder bed and maintaining at a high temperature through the fabrication process is a key differentiator in mitigating microstructure cracks.

The illustrative examples demonstrate unprecedented LM AA6061 coupons without cracks while maintaining relatively high relative densities (>98%). Columnar grain growth was observed in the build direction (i.e. in the vertical plane of the build platform). Further, the heat affected zone (HAZ) represented by melt pool and melt track formation was avoided using powder bed heating. LM fabrication approaches presented in the illustrative examples can be broadly applied to other metals prone to cracking such that the class and versatility of materials offered for LM will increase dramatically.

Controlling thermal behavior by introducing a unique temperature boundary condition in LM was shown to stop cracking in AA6061 fabrication. The reason for the mitigation of cracks could be attributed to stress relief from a slower solidification rate resulting from high induction heating temperature of the powder bed.

The high relative density of AA6061 reported in this study (98.7%) when using the induction heater could be attributed to a longer life of the liquid phase in the melt zone. Metal in its powder form has a higher absorption coefficient of the laser beam due to diffuse scattering. Again, laser absorptivity is a function of optical thickness and lower optical thickness means higher absorptivity. The liquid phase has lower optical thickness. Therefore, the illustrative examples present that AA6061 was least reflective to lasers in liquid form. Also, the liquid phase in general has a smaller thermal conductivity than after solidification; as a result, keeping the liquid phase longer (due to induction heating) ensured sufficient wetting of the substrate and areas around the melt track that eventually translated to higher relative density of the fabricated part.

Crack-free AA6061 parts were fabricated with the introduction of an induction heater that raised the powder bed temperature. A highest relative density of 98.7% was measured with elevated build platform temperature when the energy density was 20.4 J/mm$^3$. Heat affected zones represented by melt pools and melt tracks were also removed from the microstructure without the use of post-treatments.

Instead, columnar grain growth in the build direction was observed. According to the illustrative examples, crack-free fabrication of AA6061 is possible using elevated temperature LM. The in-situ heat treatment of the fabricated parts was enough to remove certain heat affected zone features such as melt tracks and melt pools as observed in the microstructure images.

In the illustrative examples, laser powder bed fusion (LPBF) of aluminum alloy (AA) 6061 used powder bed heating at 500° C. to produce crack-free components. In addition, melt-pool banding, which is a normal solidification feature in LPBF, was eliminated, illustrating solidification process modification as a consequence of powder bed heating. Corresponding microindentation hardness and tensile testing of the as-fabricated AA6061 components indicated an average Vickers hardness of HV 54, and tensile yield, ultimate strength, and elongation values of 60 MPa, 130 MPa, and 15%, respectively. These mechanical properties and those of heat treated parts showed values comparable to annealed and T6 heat treated wrought products, respectively. X-ray diffraction and optical microscopy revealed columnar grain growth in the build direction with the as-fabricated, powder-bed heated product microstructure characterized by textured, elongated grains (~25 μm wide by 400 μm in length), and both intragranular and intergranular, noncoherent Al—Si—O precipitates which did not contribute significantly to the mechanical properties. The illustrative examples show that powder bed heating may be used to assist with successful fabrication of AA6061, which is susceptible to additive manufacturing solidification cracking.

In this work, preheating of the powder bed was applied to process crack-free, and nearly fully dense AA6061 parts using LPBF. High temperature preheating of the powder bed controlled the solidification rate of the melted AA6061 in the laser-powder interaction zone, without modification of the chemical content of the commercially available AA6061 powder. The elevated temperature of the powder bed reduced the solidification rate ensuring a more congruent solidification to eliminate hot tearing. Characterization of LPBF produced AA6061 coupons using optical microscopy (OM) revealed the presence of well dispersed and large size precipitates.

By heating the powder bed during LPBF fabrication of AA6061 to reduce solidification undercooling, cracking is eliminated even for elongated grains in the build direction as well as a corresponding and essentially equiaxed grain structure in the plane perpendicular to the build direction. Having a preferred texture parallel and perpendicular to the build (solidification) direction. The large thermal conductivity as well as the high heats of fusion for aluminum alloys such as 6061 also contribute to the difficulty in achieving substantial undercooling, and powder bed heating significantly reduces these thermal barriers as well.

In the illustrative examples, AA6061 test coupons were fabricated using LPBF technology assisted with powder bed heating resulting in crack-free components. Crack-free fabrication of AA6061 has been a challenge for the AM community for some time. The use of powder bed heating during the fabrication process altered the thermodynamics such that cracking was prevented. Instead, columnar grain growth and large noncoherent precipitates (Al—Si—O) were observed in the microstructure while typical melt-pools and melt-track features characteristic of LPBF fabrication were eliminated. In addition, crack-free tensile specimens fabricated in the current study showed yield strength and ultimate tensile strength comparable to wrought AA6061 both in annealed and T6 heat treated conditions although with a reduced ductility. Unlike conventional processes using nanoparticle nucleants, the illustrative examples eliminated solidification-associated cracking by high temperature heating of the powder bed. This may be a simpler and much more direct approach to reduce solidification undercooling in powder bed AM. With better understanding of the role of powder bed heating in combination with other processing parameters such as laser power, scanning speed, layer thickness and hatch spacing that dictate the size and shape of melt-pool, the current approach could be employed in LPBF fabrication of other crack susceptible alloys.

The illustrative examples present fabrication of crack-free and pure AA6061 using LPBF using high temperature powder bed heating. The illustrative examples do not require nucleation or other alloy modifying aids. The illustrative examples present fabrication of crack-free AA6061 parts using powder bed preheating by means of an induction heater that enabled elevating the temperature of the bed during fabrication up to 1000° C. with a set point of 500° C. used in some specific implementations. The mechanical properties obtained for the AA6061 produced with this method were comparable to those of wrought AA6061, except for elongation at breakpoint.

Based on the foregoing, it can be appreciated that a number of embodiments, preferred and alternative, are disclosed herein. The techniques/embodiments described herein are in no way meant to limit the breadth of potential applications. It will be appreciated that variations of the above-disclosed and other features and functions, or alternatives thereof, may be desirably combined into many other different systems or applications. Also, it can be appreciated that various presently unforeseen or unanticipated alternatives, modifications, variations or improvements therein may be subsequently made by those skilled in the art which are also intended to be encompassed by the following claims.

What is claimed is:

1. A method of forming a crack-free aluminum alloy structure using additive manufacturing, the method comprising:

forming a powder bed of precursor aluminum alloy powder in a powder bed fusion system, wherein the aluminum alloy powder comprises AA6061, AA2014, AA2017, AA2024, AA2219, AA5083, AA7050, AA7075, AA7150, AA7178, or AA7475;

heating, with multiple heat sources, the powder bed of precursor aluminum alloy powder to a temperature in a range of 350° C. to 500° C.; and selectively melting the powder bed with an energy source to form the crack-free aluminum alloy structure, wherein the heat sources and multiple temperature sensors are used to monitor and control the temperature of specific regions of the aluminum alloy during formation, and wherein energy source parameters are adjusted dynamically and used in conjunction with the heat sources to control the temperature of the aluminum alloy to compensate for changing thermal gradient.

2. The method of claim 1, wherein the crack-free aluminum alloy structure is formed using 80 μm to 140 μm hatch spacing for the energy source.

3. The method of claim 1 further comprising:
introducing the precursor aluminum alloy powder to the powder bed fusion system without nucleation aids.

4. The method of claim 1, wherein the heat sources are induction heaters.

5. The method of claim 1 further comprising:
maintaining an $O_2$ level within the powder bed fusion system below 500 ppm throughout the forming of the crack-free aluminum alloy structure.

6. The method of claim 1, wherein forming the crack-free aluminum alloy structure comprises lowering a build platform of the powder bed fusion system by a distance equal to that of a layer thickness.

7. The method of claim 6, wherein the layer thickness is in the range 70-100 μm.

8. The method of claim 1 further comprising:
monitoring a surface temperature of the powder bed using a non-contact temperature sensor.

9. The method of claim 8, wherein the non-contact temperature sensor comprises a multi-wavelength pyrometer.

10. The method of claim 1, wherein forming the crack-free aluminum alloy structure comprises spreading the aluminum alloy powder by a back and forth movement of a rake within the powder bed fusion system.

11. The method of claim 1, wherein the crack-free aluminum alloy structure is a part having at least one channel.

12. A method of forming a crack-free aluminum alloy structure using additive manufacturing, the method comprising:
introducing a precursor aluminum alloy powder to a laser powder bed fusion system without nucleation aids, the aluminum alloy powder comprising one of AA6061, AA2014, AA2017, AA2024, AA2219, AA5083, AA7050, AA7075, AA7150, AA7178, or AA7475;

heating, with multiple induction heaters, a powder bed of the precursor aluminum alloy powder within the laser powder bed fusion system to a temperature in the range of 350° C. to 500° C.; and selectively melting the powder bed with a laser to form the crack-free aluminum alloy structure from the aluminum alloy powder, wherein the induction heaters and multiple temperature sensors are used to monitor and control the temperature of specific regions of the aluminum alloy during formation, and wherein laser parameters are adjusted dynamically and used in conjunction with the induction heaters to control the temperature of the aluminum alloy to compensate for changing thermal gradient.

13. The method of claim 1, wherein the temperature to which the powder bed is heated is within 50° C. above the solidus temperature and 30° C. below the liquidus temperature of the precursor aluminum alloy powder.

14. The method of claim 1, wherein forming the crack-free aluminum alloy structure comprises raising the powder bed by a height multiple of three of a layer thickness.

15. The method of claim 1, wherein the energy source is a laser.

16. The method of claim 15, wherein parameters applied to the laser include 400 W laser power and 1400 mm/s scanning speed.

17. The method of claim 15, wherein forming the crack-free aluminum alloy structure comprises forming a microstructure gradient within the aluminum alloy by dynamically changing at least one of a number of laser parameters along a scan vector, wherein the laser parameters comprise laser power, laser scan speed, and laser focus, wherein laser focus is altered by changing the height of the laser measured by an offset from a focal position.

18. The method of claim 1, wherein the energy source is an electron beam.

19. The method of claim 1, wherein the temperature sensors include thermocouples configured to move dynamically to monitor different locations on a build platform.

20. The method of claim 1, wherein the temperature sensors include thermocouples fixed at different specified fabrication heights.

21. The method of claim 1, further comprising heat treating the aluminum alloy structure by:
solutionizing heat treatment at 520° C. for 50 minutes;
water quenching;
aging at 210° C. minutes; and
cooling to 25° C. at a rate of 3° C. per minute.

22. The method of claim 1, wherein forming the crack-free aluminum alloy structure comprises forming a microstructure gradient within the aluminum alloy by applying different combinations of hatch spacing, energy source scan speed, energy source power, and powder temperature to respective defined zones of the structure.

23. The method of claim 12 further comprising:
maintaining an $O_2$ level within the laser powder bed fusion system below 500 ppm throughout the forming of the crack-free aluminum alloy structure.

* * * * *